United States Patent
Kato et al.

(10) Patent No.: US 10,252,762 B2
(45) Date of Patent: Apr. 9, 2019

(54) OPERATION CONTROL APPARATUS AND BICYCLE DISPLAY

(71) Applicant: Shimano Inc., Sakai, Osaka (JP)

(72) Inventors: Ayumi Kato, Osaka (JP); Jun Gao, Osaka (CN); Ryuichiro Takamoto, Osaka (JP); Hiroyuki Miyoshi, Osaka (JP)

(73) Assignee: Shimano Inc., Osaka (JP)

( * ) Notice: Subject to any disclaimer, the term of this patent is extended or adjusted under 35 U.S.C. 154(b) by 212 days.

(21) Appl. No.: 15/220,948

(22) Filed: Jul. 27, 2016

(65) Prior Publication Data
US 2017/0029057 A1 Feb. 2, 2017

(30) Foreign Application Priority Data
Jul. 29, 2015 (JP) ................................. 2015-149847

(51) Int. Cl.
*B62M 6/55* (2010.01)
*B62J 99/00* (2009.01)
*B62J 6/00* (2006.01)

(52) U.S. Cl.
CPC .............. *B62J 6/001* (2013.01); *B62J 99/00* (2013.01); *B62M 6/55* (2013.01); *B62J 2099/0013* (2013.01)

(58) Field of Classification Search
CPC ... B62M 6/55; B62L 6/001; B62J 2099/0013; B62J 99/00
USPC .......................................................... 701/36
See application file for complete search history.

(56) References Cited

U.S. PATENT DOCUMENTS

| | | | |
|---|---|---|---|
| 8,655,548 B2 | 2/2014 | Ichida et al. | |
| 9,229,712 B2 | 1/2016 | Takamoto et al. | |
| 9,545,855 B2 * | 1/2017 | Takamoto | B60L 15/20 |
| 9,794,683 B2 * | 10/2017 | Kim | H04R 1/323 |
| 9,815,522 B2 * | 11/2017 | Tachibana | B62M 9/122 |
| 9,862,442 B2 * | 1/2018 | Fusari | B62J 6/00 |
| 9,919,616 B2 * | 3/2018 | Watarai | B60L 15/20 |

(Continued)

FOREIGN PATENT DOCUMENTS

| | | |
|---|---|---|
| DE | 10338354 A1 | 3/2005 |
| DE | 102012216718 A1 | 8/2013 |

(Continued)

OTHER PUBLICATIONS

U.S. Appl. No. 14/022,457; Bicycle Component Control Apparatus; R Takamoto; filed Sep. 10, 2013.

*Primary Examiner* — Atul Trivedi
(74) *Attorney, Agent, or Firm* — Global IP Counselors, LLP

(57) ABSTRACT

An operation control apparatus and a bicycle display device are provided that are configured for improving the usability. The operation control apparatus includes a controller, which is configured to operate a bicycle electronic apparatus that can be mounted on a bicycle. The operation control apparatus is configured to cause a predetermined control target to execute a predetermined operation of the bicycle electronic apparatus according to an operation of an operating unit inputted to the controller. The controller is configured to set at least one of the predetermined control target and the predetermined operation, according to at least one of the configuration, the type and the function of the bicycle electronic apparatus.

16 Claims, 10 Drawing Sheets

(56) References Cited

U.S. PATENT DOCUMENTS

| | | | | |
|---|---|---|---|---|
| 9,944,167 B2* | 4/2018 | Biderman | | B60L 15/20 |
| 9,966,785 B2* | 5/2018 | Kato | | B62M 9/122 |
| 2003/0024310 A1* | 2/2003 | Montagnon | | B62J 99/00 |
| | | | | 73/489 |
| 2004/0090040 A1* | 5/2004 | Pearson | | B62J 6/00 |
| | | | | 280/288.4 |
| 2008/0290999 A1* | 11/2008 | Chen | | B62J 6/16 |
| | | | | 340/432 |
| 2009/0171529 A1* | 7/2009 | Hayatoma | | B60K 35/00 |
| | | | | 701/36 |
| 2010/0123402 A1* | 5/2010 | Chen | | B60Q 1/1423 |
| | | | | 315/156 |
| 2010/0198453 A1* | 8/2010 | Dorogusker | | A63B 24/0062 |
| | | | | 701/31.4 |
| 2010/0225458 A1* | 9/2010 | Jow | | B62H 5/20 |
| | | | | 340/432 |
| 2011/0074563 A1* | 3/2011 | Chang | | B62J 6/003 |
| | | | | 340/432 |
| 2012/0221205 A1* | 8/2012 | Ichida | | B62J 99/00 |
| | | | | 701/37 |
| 2013/0214939 A1* | 8/2013 | Washlow | | G01S 7/003 |
| | | | | 340/901 |
| 2014/0043151 A1* | 2/2014 | Lin | | B62J 6/005 |
| | | | | 340/432 |
| 2014/0209400 A1* | 7/2014 | Yao | | B62M 6/45 |
| | | | | 180/167 |
| 2015/0210287 A1* | 7/2015 | Penilla | | B60W 40/08 |
| | | | | 701/49 |
| 2016/0016626 A1* | 1/2016 | Thompson | | B62M 6/45 |
| | | | | 701/22 |
| 2016/0016628 A1* | 1/2016 | Thompson | | B62K 15/008 |
| | | | | 180/220 |
| 2016/0016630 A1* | 1/2016 | Thompson | | B62K 15/008 |
| | | | | 280/287 |
| 2016/0016635 A1* | 1/2016 | Thompson | | B62K 15/008 |
| | | | | 301/124.2 |
| 2016/0039496 A1* | 2/2016 | Hancock | | G01S 19/19 |
| | | | | 701/60 |
| 2016/0050487 A1* | 2/2016 | Kim | | H04R 1/323 |
| | | | | 381/74 |
| 2016/0096571 A1* | 4/2016 | Fusari | | B62J 6/00 |
| | | | | 362/473 |
| 2016/0121962 A1* | 5/2016 | Miyoshi | | B62J 99/00 |
| | | | | 701/22 |
| 2016/0311491 A1* | 10/2016 | Watarai | | B60L 15/20 |
| 2017/0021897 A1* | 1/2017 | Bortolozzo | | B60W 40/08 |
| 2017/0225742 A1* | 8/2017 | Hancock | | B62M 6/45 |
| 2017/0334522 A1* | 11/2017 | Zahid | | B62M 25/08 |
| 2018/0018840 A1* | 1/2018 | Xia | | B62H 5/00 |
| 2018/0020528 A1* | 1/2018 | Luk | | H05B 37/0227 |
| 2018/0099718 A1* | 4/2018 | Bleecker | | B62D 49/0692 |

FOREIGN PATENT DOCUMENTS

| | | |
|---|---|---|
| DE | 102014007265 A1 | 11/2014 |
| JP | 2005-297712 A | 10/2005 |

* cited by examiner

OPERATION CONTROL APPARATUS AND BICYCLE DISPLAY

CROSS-REFERENCE TO RELATED APPLICATIONS

This application claims priority to Japanese Patent Application No. 2015-149847, filed on Jul. 29, 2015. The entire disclosure of Japanese Patent Application No. 2015-149847 is hereby incorporated herein by reference.

BACKGROUND

Field of the Invention

The present invention generally relates to an operation control apparatus and a bicycle display device that can be mounted on a bicycle.

Background Information

In the bicycle transmission control apparatus disclosed in Japanese Laid-Open Patent Publication No. 2005-297712, the association between a transmission switch and the operation of a transmission device can be changed by operating a mode switch and a transmission switch.

SUMMARY

Generally, the present disclosure is directed to various features of an operation control apparatus and a bicycle display device, When operating an operating unit, such as a switch, an operation and the like, a, control target is preferably easily changed or set.

One object of the present invention is to provide an operation control apparatus and a bicycle display device that are capable of improving the usability.

In view of the state of the known technology and in accordance with a first aspect of the present disclosure, an operation control apparatus according to the present invention comprises a controller configured to communicate with a bicycle electronic apparatus that is configured to be mounted on a bicycle. The controller is configured to operate a predetermined control target to execute a predetermined operation of the predetermined control target according to an operation of an operating unit that is inputted to the controller. The controller is configured to set at least one of the predetermined control target or the predetermined operation according to at least one of a configuration, a type and a function of the bicycle electronic apparatus.

According to one example of the operation control apparatus, the controller is configured to set at least one of the predetermined control target and the predetermined operation, when at least one of the configuration, the type and the function of the bicycle electronic apparatus is changed.

One example of the operation control apparatus further comprises a storage unit configured to store operation target information that corresponds to at least one of the predetermined control target and the predetermined operation.

According to one example of the operation control apparatus, the storage unit is configured to store the operation target information in association with connected apparatus information corresponding to at least one of the configuration, the type, and the function of the bicycle electronic apparatus.

According to one example of the operation control apparatus, the controller is configured to acquire the connected apparatus information by communicating with the bicycle electronic apparatus, and set at least one of the predetermined control target and the predetermined operations based on the operation target information that corresponds to the connected apparatus information that is stored in the storage unit.

According to one example of the operation control apparatus, the storage unit is configured to store a plurality of pieces of the operation target information in association with one piece of the connected apparatus information.

According to one example of the operation control apparatus, the storage unit is configured to store operation target order information related to the priority in association with the plurality of pieces of the operation target information, and the controller is configured to set at least one of the predetermined control target and the predetermined operation based on the operation target order information.

According to one example of the operation control apparatus, the storage unit stores a plurality of pieces of the operation connected apparatus information and the operation target information that respectively corresponds to the plurality of pieces of the connected apparatus information.

According to one example of the operation control apparatus, the storage unit is configured to store connected apparatus order information related to the priority in association with the plurality of pieces of connected apparatus information, and the controller is configured to set at least one of the predetermined control target and the predetermined operation based on the connected apparatus order information.

One example of the operation control apparatus further comprises a connection part that is configured to be connected to the bicycle electronic apparatus via an electric wire.

According to one example of the operation control apparatus, the electric wire and the connection part are connected by a detachable and reattachable connection.

One example of the operation control apparatus further comprises a wireless communication unit that can communicate with the bicycle electronic apparatus.

According to one example of the operation control apparatus, the storage unit is configured to store arrangement information related to the arrangement of the operating unit on the bicycle, and the controller is configured to set at least one of the predetermined control target and the predetermined operation based on the arrangement information.

One example of the operation control apparatus, the controller is configured to communicate with a first display unit and a second display unit. The first display is equipped with a switch for a lamp of the bicycle. The second display unit is not equipped with a switch for the bicycle lamp. The controller is configured to switch a state of a screen of the first display unit when the operating unit is operated. The controller is configured to switch the lighting state of the bicycle lamp when the operating unit is operated.

According to one example of the operation control apparatus, the controller is configured to communicate with a setting changing device to change the association between the connected apparatus information and the operation target information, which are stored in the storage unit.

One embodiment of the bicycle display device according to the present invention comprises a display unit, an operating unit, a housing that can be attached to a bicycle and to support the display unit and the operating unit, and a controller configured to communicate with a bicycle electronic apparatus that is configured to mount on the bicycle. The controller is configured to operate a predetermined control target according to an operation of the operating unit inputted to the controller. The bicycle display device is configured to set the predetermined control target according to an instruction from one of the controller and an external device.

The operation control apparatus and the bicycle display device described above are able to improve the usability.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
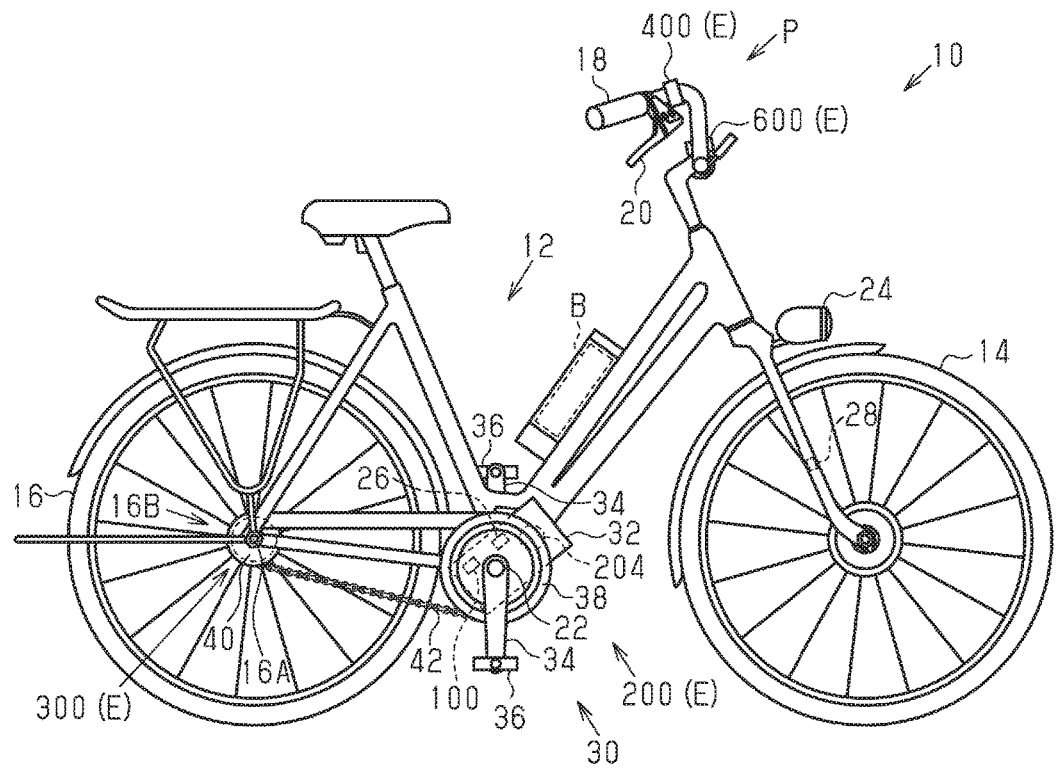
FIG. 1 is a side elevational view of a bicycle equipped with an operation control apparatus in accordance with a first embodiment.

As shown in FIG. 1, a bicycle 10 comprises an operation control apparatus 100. In one example, the bicycle 10 further comprises a bicycle electronic apparatus E, an operating unit P, and an electric wire L (refer to FIG. 3). The bicycle electronic apparatus E includes an assist unit 200, a transmission unit 300, a first operating unit 400, a second operating unit 500 (refer to FIG. 2) and a first display unit 600. The electric wire L electrically connects each bicycle electronic apparatus so that power line communication (PLC) can be carried out between the bicycle electronic apparatuses E. The operating unit comprises a plurality of operating units. The operating units are included in the units 400, 500 and 600. The bicycle electronic apparatus E can be operated in response to an operation of a corresponding operating unit P.

The bicycle 10 further comprises a frame 12, a front wheel 14, a rear wheel 16, a handlebar 18, a pair of brake levers 20 and a crankshaft 22. The frame 12 is the main body of the bicycle 10. The front wheel 14 and the rear wheel 16 are supported to the frame 12 in a rotatable state with respect to the frame 12. The handlebar 18 is supported to the frame 12 so as to be able to change the orientation of the front wheel 14. The brake levers 20 are attached to the handlebar 18. The crankshaft 22 is supported to the frame 12 in a rotatable state with respect to the frame 12.

The bicycle 10 further comprises a battery B, a lamp 24, a torque sensor 26, a vehicle speed sensor 28 and a drive mechanism 30. The battery B is attached to the frame 12. The battery B is electrically connected to the lamp 24, the torque sensor 26, the vehicle speed sensor 28, the operation control apparatus 100, and each of the units 200, 300, 400, 500 and 600 by the electric wire L. The lamp 24 is included in the bicycle electronic apparatus E. The lamp 24 is attached to the frame 12 and is capable of irradiating light in the traveling direction of the bicycle 10. The torque sensor 26 is attached to the drive mechanism 30 and outputs a signal that reflects a manual drive force that is inputted to the crankshaft 22.

The drive mechanism 30 is configured to transmit drive force from the crankshaft 22 to the rear wheel 16. The drive mechanism 30 comprises a drive unit 32, a pair of crank arms 34, a pair of pedals 36, a front sprocket 38, a rear sprocket 40 and a chain 42. The drive unit 32 is attached to the frame 12 and is detachable and reattachable with respect to the frame 12 without causing damage. The drive unit 32 supports the crankshaft 22 in a state in which rotation is possible with respect to the frame 12. The drive unit 32 includes the operation control apparatus 100 and the assist unit 200.

The crank arms 34 are coupled to the crankshaft 22 so as to be integrally rotatable with the crankshaft 22. The pedals 36 are supported to different crank arms 34 in a rotatable state with respect to the crank arms 34. The front sprocket 38 is coupled to the crankshaft 22 via a one-way clutch (not shown). The rear sprocket 40 is supported by an axle 16A of the rear wheel 16 in a rotatable state with respect to the axle 16A. The chain 42 is wound to the front sprocket 38 and the rear sprocket 40.

When a manual drive force for rotating the crank arms 34 forward is inputted to the pedals 36, the crank arms 34 and the crankshaft 22, which are integrally rotated forward with respect to the frame 12. In this case, the rotation of the crankshaft 22 is transmitted to the front sprocket 38, and the rotation of the front sprocket 38 is transmitted to the rear sprocket 40 and the rear wheel 16 by the chain 42. When a manual drive force is inputted to the pedals 36 for rearward rotating the crank arms 34, the crank arms 34 and the crankshaft 22 are integrally rotated rearward with respect to the frame 12. In this case, the rotation of the crankshaft 22 is not transmitted to the front sprocket 38 by an action of the one-way clutch.

The torque sensor 26 is, for example, a strain sensor. The torque sensor 26 is provided to the drive unit 32. The torque sensor 26 is attached to a power transmission path from, for example, the crankshaft 22 to the front sprocket 38. The torque that is inputted to the crankshaft 22 has a correlation with the manual drive force that is inputted to the pedal 36. For this reason, the torque sensor 26 outputs a signal reflecting the manual drive force.

The vehicle speed sensor 28 is, for example, a magnetic sensor. The vehicle speed sensor 28 is provided to, for example, a front fork of the frame 12. The vehicle speed sensor 28 responds to a magnet that is provided to the front wheel 14 and outputs a signal reflecting the rotational speed of the front wheel 14.

Figure 2:
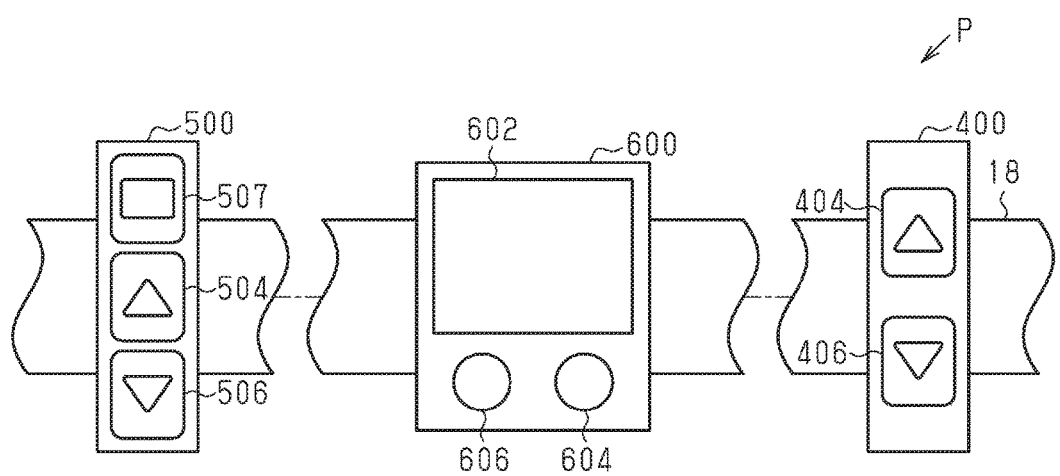
FIG. 2 is a plan view of the units that are attached to the handlebar in FIG. 1.

As shown in FIG. 2, the first operating unit 400 is provided in the vicinity of one of the brake levers 20 (refer to FIG. 1) of the handlebar 18. The first operating unit 400 is preferably provided in a position that can be operated by a rider, who rides the bicycle 10 (refer to FIG. 1), while gripping the handlebar 18. The first operating unit 400 is configured to be detachable and reattachable with respect to the handlebar 18 without causing damage. The first operating unit 400 comprises, for example, an operating unit P that is configured to operate the transmission unit 300 (refer to FIG. 1). The second operating unit 500 is provided in the vicinity of the other brake lever 20 of the handlebar 18. The second operating unit 500 is preferably provided in a position that can be operated by a rider while gripping the handlebar 18. The second operating unit 500 is configured to be detachable and reattachable with respect to the handlebar 18 without causing damage. The second operating unit 500 comprises, for example, an operating unit P that is configured to operate the assist unit 200 (refer to FIG. 1), The first display unit 600 is attached to, for example, an intermediate portion of the handlebar 18, via a bracket (not shown). The first display unit 600 is preferably provided to the central portion of the handlebar 18. The first display unit 600 is detachable and reattachable with respect to the handlebar 18 without causing damage. The bracket is fixed to the handlebar 18, and the first display unit 600 is configured to be detachable and reattachable with respect to the bracket without causing damage.

Figure 3:
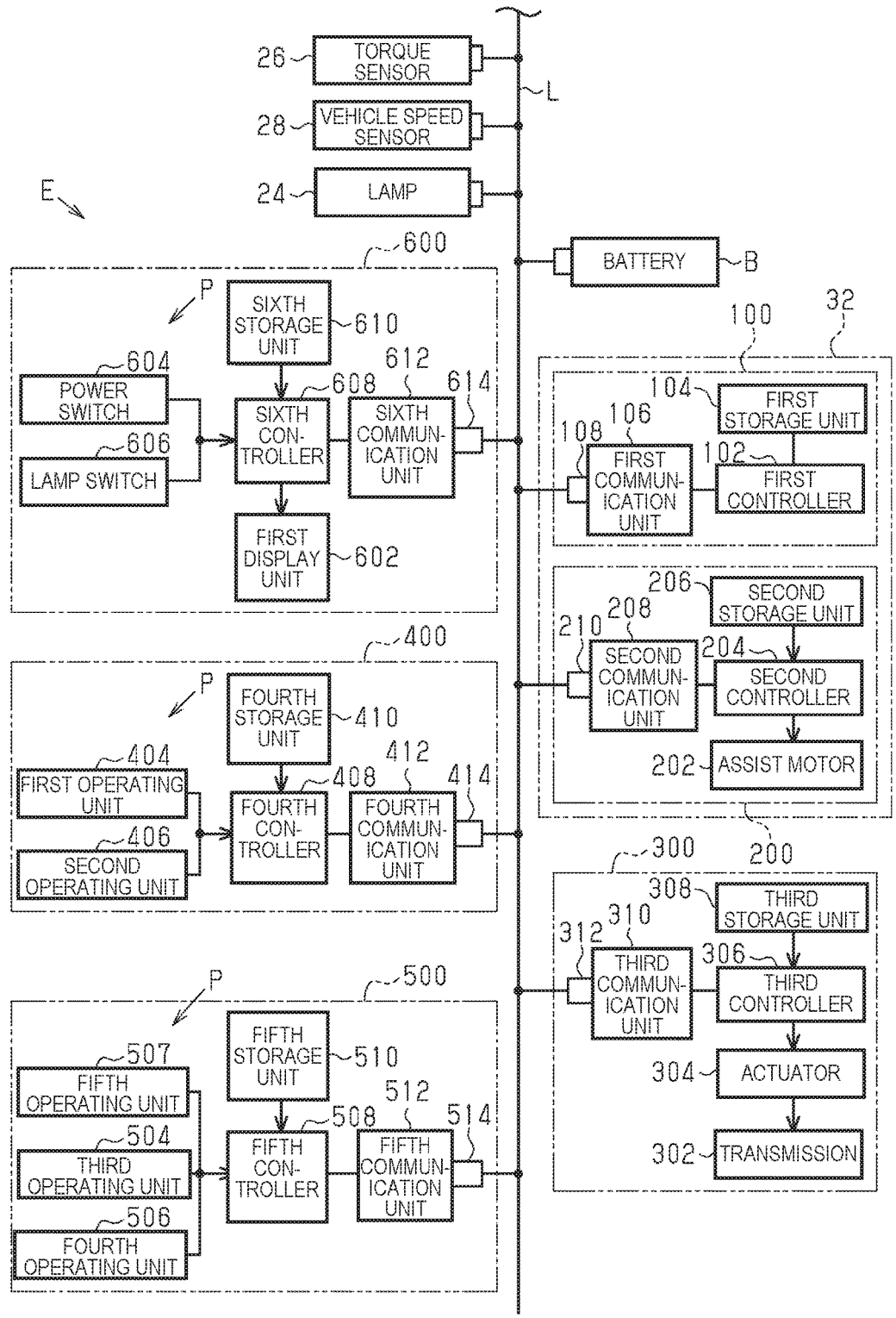
FIG. 3 is a block diagram showing an electrical configuration of the bicycle in FIG. 1.

As shown in FIG. 3, the operation control apparatus 100 is provided to the drive unit 32. The operation control apparatus 100 includes a first controller 102. In one example, the operation control apparatus 100 further includes a first storage unit 104, a first communication unit 106 and a first connection part 108. The first controller 102 is configured (programmed) to operate a predetermined control target. The predetermined control target is the bicycle electronic apparatus E. If there are plural bicycle electronic apparatuses E, the predetermined control target is at least one of the plural bicycle electronic apparatuses E. The first controller 102 is configured to operate a predetermined control target to execute a predetermined operation of the predetermined control target (the bicycle electronic apparatus E) according to an operation of the operating unit P. That is, the operation control apparatus 100 comprises the first controller 102, which is configured to communicate with the bicycle electronic apparatus E that can be mounted on the bicycle 10. The first controller 102 is configured to operate a predetermined control target to execute a predetermined operation of the predetermined control target (the bicycle electronic apparatus E) according to an operation of the operating unit P. The first controller 102 includes a calculation processing device for executing a predetermined control program. The calculation processing device includes, for example, a CPU (Central Processing Unit) or an MPU (Micro Processing Unit) that includes a one or more processors. The first controller 102 also preferably includes other conventional components such as an input interface circuit, an output interface circuit.

The first storage unit 104 is preferably any memory device (i.e., a non-transitory computer readable medium such as a ROM (Read Only Memory) device, a hard disk, etc.). The first storage unit 104 is configured to store information used for controlling the first controller 102. The first storage unit 104 includes non-volatile memory. The information stored in the first storage unit 104 includes operation target information, which corresponds to at least one of the predetermined control target and the predetermined operations, and apparatus association information that associates the operation target information with connected apparatus information, which corresponds to at least one of the configuration, the type, and the function of the bicycle electronic apparatus E. The first storage unit 104 is configured to store a predetermined control program that is executed by the calculation processing device of the first controller 102. The operation target information that corresponds to a predetermined control target includes identification information.

The first communication unit 106 is configured to transmit power and information from the electric wire L to the first controller 102, and is configured to transmit information from the first controller 102 to the electric wire L. The first connection part 108 is provided to the first communication unit 106, and is connected to the bicycle electronic apparatus E via the electric wire L. The first connection part 108 is, for example, detachable and reattachable with respect to the electric wire L without causing damage. The first connection part 108 is equipped with a connection terminal, and the electric wire L comprises a connector that is detachable and reattachable with the connection terminal of the first connection part 108 to form a detachable and reattachable connection. By the electric wire L being connected with the first connection part 108, the electric wire L and the first controller 102 are electrically connected via the first communication unit 106.

The assist unit 200 is provided to a housing of the drive unit 32. The assist unit 200 comprises an assist motor 202, a second controller 204, a second storage unit 206, a second communication unit 208 and a second connection part 210. The second controller 204 includes a calculation processing device for executing a predetermined control program. The calculation processing device includes, for example, a CPU or an MPU that includes a one or more processors. The second controller 204 also preferably includes other conventional components such as an input interface circuit, an output interface circuit. The assist unit 200 can be operated based on an assist mode that is selected from a plurality of assist modes with different assist ratios. The assist motor 202 is, for example, an electric motor. The assist unit 200 can further comprise a reduction gear for decelerating the rotation of the assist motor 202.

The second controller 204 is configured (programmed) to select an assist mode that the assist unit 200 is caused to execute from among a plurality of assist modes, based on an operation, etc., of the second operating unit 500. The second controller 204 controls the assist motor 202 based on the selected assist mode and the detection result of the torque sensor 26, or the like. The output of the assist motor 202 is transmitted to the power transmission path from the crankshaft 22 (refer to FIG. 1) to the front sprocket 38 (refer to FIG. 1). The assist motor 202 assists the manual drive force according to the detection result of the torque sensor 26. The second storage unit 206 stores a predetermined control program that is executed by the calculation processing device of the second controller 204, and identification information, etc., related to the assist unit 200. The identification information includes at least one of, for example, the model number, the serial number, and the software version information of the assist unit 200. The assist mode can include a mode to not assist. The second storage unit 206 is preferably any memory device (i.e., a non-transitory computer readable medium such as a ROM (Read Only Memory) device, hard disk, etc.).

The second communication unit 208 is configured to transmit power and information from the electric wire L to the second controller 204, and is configured to transmit information from the second controller 204 to the electric wire L. The second connection part 210 is provided to the second communication unit 208, and is detachable and reattachable with respect to the electric wire L without causing damage. The second connection part 210 is equipped with a connection terminal, and the electric wire L comprises a connector that is detachable and reattachable with the connection terminal of the second connection part 210 to form a detachable and reattachable connection. By the electric wire L being connected with the second connection part 210, the electric wire L and the second controller 204 are electrically connected via the second communication unit 208.

The transmission unit 300 is provided to a hub 16B (refer to FIG. 1) of the rear wheel 16. The transmission unit 300 comprises a transmission 302, an actuator 304, a third controller 306, a third storage unit 308, a third communication unit 310 and a third connection part 312. The transmission 302 is configured to change the gear ratio of the bicycle 10. The transmission 302 comprises, for example, a planetary gear mechanism (not shown), and is an internal transmission that is integrated with the hub 16B of the rear wheel 16. The actuator 304 is, for example, an electric motor, which causes the transmission 302 to change the gear ratio of the bicycle 10.

The third controller 306 is configured (programmed) to control the actuator 304 based on a running state of the bicycle 10 or an operation of the first operating unit 400. The third controller 306 includes a calculation processing device for executing a predetermined control program. The calculation processing device includes, for example, a CPU or an MPU that includes a one or more processors. The third controller 306 also preferably includes other conventional components such as an input interface circuit, an output interface circuit. The third storage unit 308 is configured to store a predetermined control program that is executed by the calculation processing device of the third controller 306, and identification information, etc., related to the transmission unit 300. The identification information includes at least one of, for example, the model number, the serial number, and the software version information of the transmission unit 300. The third storage unit 308 is preferably any memory device (i.e., a non-transitory computer readable medium such as a ROM (Read Only Memory) device, hard disk, etc.).

The third communication unit 310 is configured to transmit power and information from the electric wire L to the third controller 306, and is configured to transmit information from the third controller 306 to the electric wire L. The third connection part 312 is provided to the third communication unit 310, and is detachable and reattachable with respect to the electric wire L without causing damage. The third connection part 312 is equipped with a connection terminal, and the electric wire L comprises a connector that is detachable and reattachable with the connection terminal of the third connection part 312 to form a detachable and reattachable connection. By the electric wire L being connected with the third connection part 312, the electric wire L and the third controller 306 are electrically connected via the third communication unit 310.

The first operating unit 400 includes a first operating unit 404, a second operating unit 406, a fourth controller 408, a fourth storage unit 410, a fourth communication unit 412 and a fourth connection part 414. The first operating unit 404 is an operating unit P that is operated to increase the gear ratio of the transmission 302. The first operating unit 404 includes, for example, a push-button type switch. The second operating unit 406 is an operating unit P that is operated to decrease the gear ratio of the transmission 302. The second operating unit 406 includes, for example, a push-button type switch.

The fourth controller 408 is configured to generate an operation signal that is outputted to the operation control apparatus 100 based on an operation of each of the first operating unit 404 and the second operating unit 406. The fourth controller 408 includes a calculation processing device for executing a predetermined control program. The calculation processing device includes, for example, a CPU or an MPU that includes a one or more processors. The fourth controller 408 also preferably includes other conventional components such as an input interface circuit, an output interface circuit. The fourth storage unit 410 is configured to store a predetermined control program that is executed by the calculation processing device of the fourth controller 408, and identification information, etc., related to the first operating unit 400. The identification information includes at least one of, for example, the model number, the serial number, and the software version information of the first operating unit 400. The fourth storage unit 410 is preferably any memory device (i.e., a non-transitory computer readable medium such as a ROM (Read Only Memory) device, hard disk, etc.).

The fourth communication unit 412 is configured to transmit power and information from the electric wire L to the fourth controller 408, and is configured to transmit information from the fourth controller 408 to the electric wire L. The fourth connection part 414 is provided to the fourth communication unit 412, and is detachable and reattachable with respect to the electric wire L without causing damage. The fourth connection part 414 is equipped with a connection terminal, and the electric wire L comprises a connector that is detachable and reattachable with the connection terminal of the fourth connection part 414 to form a detachable and reattachable connection. By the electric wire L being connected with the fourth connection part 414, the electric wire L and the fourth controller 408 are electrically connected via the fourth communication unit 412.

The second operating unit 500 includes a third operating unit 504, a fourth operating unit 506, a fifth operating unit 507, a fifth controller 508, a fifth storage unit 510, a fifth communication unit 512 and a fifth connection part 514. The third operation unit 504 is an operating unit P that is operated to change the assist mode of the assist unit 200 so that the assisting force of the assist unit 200 is increased. The fourth operation unit 506 is an operating unit P that is operated to change the assist mode of the assist unit 200 so that the assisting force of the assist unit 200 is decreased. The fifth operating unit 507 is an operating unit P to cause a predetermined control target to execute a predetermined operation.

The fifth controller 508 is configured to generate an operation signal that is outputted to the operation control apparatus 100 based on an operation of each of the third operating unit 504, the fourth operating unit 506 and the fifth operating unit 507. The fifth controller 508 includes a calculation processing device for executing a predetermined control program. The calculation processing device includes, for example, a CPU or an MPU that includes a one or more processors. The fifth controller 508 also preferably includes other conventional components such as an input interface circuit, an output interface circuit. The fifth storage unit 510 is configured to store a predetermined control program that is executed by the calculation processing device of the fifth controller 508, and identification information, etc., related to the second operating unit 500. The identification information includes at least one of, for example, the model number, the serial number, and the software version information of the second operating unit 500. The fifth storage unit 510 is preferably any memory device (i.e., a non-transitory computer readable medium such as a ROM (Read Only Memory) device, hard disk, etc.).

The fifth communication unit 512 is configured to transmit power and information from the electric wire L to the fifth controller 508, and is configured to transmit information from the fifth controller 508 to the electric wire L. The fifth connection part 514 is provided to the fifth communication unit 512, and is detachable and reattachable with respect to the electric wire L without causing damage. The fifth connection part 514 is equipped with a connection terminal, and the electric wire L comprises a connector that is detachable and reattachable with the connection terminal of the fifth connection part 514 to form a detachable and reattachable connection. By the electric wire L being connected with the fifth connection part 514, the electric wire L and the fifth controller 508 are electrically connected via the fifth communication unit 512.

The first display unit 600 includes a first display unit 602, a power switch 604, a lamp switch 606, a sixth controller 608, a sixth storage unit 610, a sixth communication unit 612 and a sixth connection part 614. The first display unit 602 is, for example, a liquid crystal display. The first display unit 602 is configured to display information related to at least one of a running state of the bicycle 10 and the traveling environment. The power switch 604 is an operating unit P that is operated to switch ON and OFF the supply of power from the battery B to each bicycle electronic apparatus E including the first display unit 600. The lamp switch 606 is an operating unit P that is operated to switch the lighting state of the lamp 24.

The sixth controller 608 is configured to display information that is sent via the electric wire L to the first display unit 602, switches the state of the display screen of the first display unit 602, and the like. Information that is sent via the electric wire L includes, for example, the traveling speed of the bicycle, the travel distance, the assist mode, the current gear shift stage, and the remaining amount of the battery B. The sixth controller 608 includes a calculation processing device for executing a predetermined control program. The calculation processing device includes, for example, a CPU or an MPU that includes a one or more processors. The sixth controller 608 also preferably includes other conventional components such as an input interface circuit, an output interface circuit. The sixth storage unit 610 is configured to store a predetermined control program that is executed by the calculation processing device of the sixth controller 608, and identification information, etc., related to the first display unit 600. The identification information includes at least one of, for example, the model number, the serial number, and the software version information of the first operating unit 600. The sixth storage unit 610 is preferably any memory device (i.e., a non-transitory computer readable medium such as a ROM (Read Only Memory) device, hard disk, etc.).

The sixth communication unit 612 is configured to transmit power and information from the electric wire L to the sixth controller 608, and is configured to transmit information from the sixth controller 608 to the electric wire L. The sixth connection part 614 is provided to the sixth communication unit 612, and is detachable and reattachable with respect to the electric wire L. The sixth connection part 614 is equipped with a connection terminal, and the electric wire L comprises a connector that is detachable and reattachable with the connection terminal of the sixth connection part 614 to form a detachable and reattachable connection. By the electric wire L being connected with the sixth connection part 614, the electric wire L and the sixth controller 608 are electrically connected via the sixth communication unit 612. The sixth connection part 614 and the electric wire L can be connected via a bracket. In this case, a first terminal that can be connected to the connection terminal of the sixth connection part 614 and a second terminal that can be connected to the electric wire L are provided to the bracket.

Figure 4:
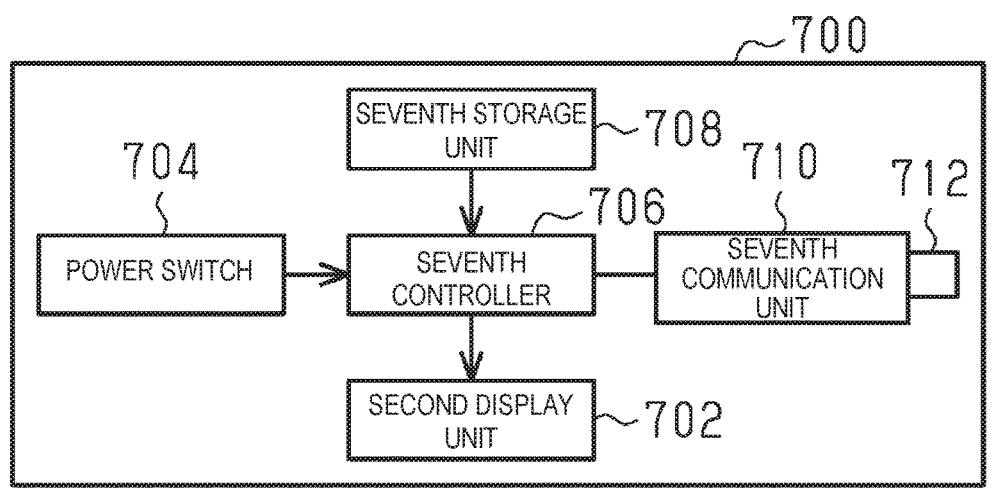
FIG. 4 is a block diagram showing a configuration of the second display unit.
Figure 7:
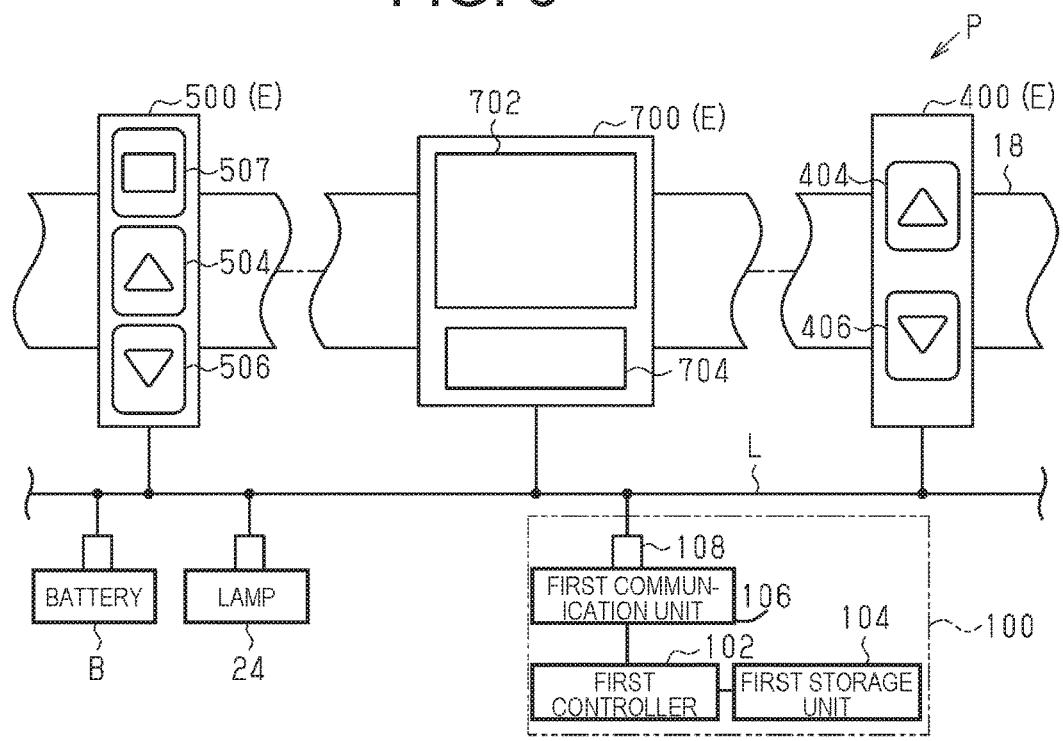
FIG. 7 is a schematic view showing a part of a bicycle to which is mounted the second display unit.

A second display unit 700 shown in FIG. 7 can be attached to the bicycle 10 instead of the first display unit 600. The second display unit 700 can be detachably mounted to a common bracket with the first display unit 600. FIG. 4 is a block diagram of the second display unit 700. The second display unit 700 includes a second display unit 702, a power switch 704, a seventh controller 706, a seventh storage unit 708, a seventh communication unit 710 and a seventh connection part 712.

The second display unit 702 is, for example, a liquid crystal display. The second display unit 702 is configured to display information related to at least one of a running state of the bicycle 10 and the traveling environment. The power switch 704 is an operating unit P that is operated to switch ON and OFF the supply of power from the battery B to each bicycle electronic apparatus E including the second display unit 700.

The seventh controller 706 is configured to display information that is sent via the electric wire L to the second display unit 702, switches the state of the display screen of the second display unit 702, and the like. The seventh controller 706 includes a calculation processing device for executing a predetermined control program. The calculation processing device includes, for example, a CPU or an MPU that includes a one or more processors. The seventh controller 706 also preferably includes other conventional components such as an input interface circuit, an output interface circuit. The seventh storage unit 708 is configured to store a predetermined control program that is executed by the calculation processing device of the seventh controller 706, and identification information, etc., related to the second display unit 700. The identification information includes at least one of, for example, the model number, the serial number, and the software version information of the second display unit 700. The seventh storage unit 708 is preferably any memory device (i.e., a non-transitory computer readable medium such as a ROM (Read Only Memory) device, hard disk, etc.).

The seventh communication unit 710 is configured to transmit power and information from the electric wire L to the seventh controller 706, and is configured to transmit information from the seventh controller 706 to the electric wire L. The seventh connection part 712 is provided to the seventh communication unit 710, and is detachable and reattachable with respect to the electric wire L. The seventh connection part 712 is equipped with a connection terminal, and the electric wire L comprises a connector that is detachable and reattachable with the connection terminal of the seventh connection part 712 to form a detachable and reattachable connection. By the electric wire L being connected with the seventh connection part 712, the electric wire L and the seventh controller 706 are electrically connected via the seventh communication unit 710. In the case that a first terminal, which can be connected to the connection terminal of the sixth connection part 614 (refer to FIG. 3), is provided to the bracket, this first terminal is configured to be connectable to the seventh connection part 712.

The first controller 102 of the operation control apparatus 100 is configured to acquire connected apparatus information by communicating with the bicycle electronic apparatus E, and is configured to set at least one of the predetermined control target that is operated when operating the fifth operating unit 507, and the predetermined operation of the predetermined control target that is operated when operating the fifth operating unit 507, based on the acquired connected apparatus information and the apparatus association information that is stored in the first storage unit 104. Table 1 is a table showing one example of the apparatus association information which defines the association relationship between the connected apparatus information and the operation target information which are stored in the first storage unit 104.

TABLE 1

| OPERATING UNIT | CONNECTED APPARATUS INFORMATION | OPERATION TARGET INFORMATION | |
|---|---|---|---|
| | | CONTROL TARGET | OPERATION |
| FIFTH OPERATING UNIT | FIRST DISPLAY UNIT | FIRST DISPLAY UNIT | SWITCH DISPLAY |
| | SECOND DISPLAY UNIT | LAMP | SWITCH LIGHTING STATE |

The connected apparatus information includes identification information of the bicycle electronic apparatus E that can be connected. Hereinafter, there are cases in which setting at least one of the predetermined control target that is operated when operating an operating unit P not limited to the fifth operating unit 507, and the predetermined operation of the predetermined control target that is operated when operating the operating unit P, is referred to as "to set the operating unit" Hereinafter, there are cases in which changing at least one of the predetermined control target that is operated when operating an operating unit not limited to the fifth operating unit 507, and the predetermined operation of the predetermined control target that is operated when operating the operating unit P, is referred to as "to change the setting of the operating unit."

In the initial state, the first controller 102 has not set a predetermined control target that is operated when operating the fifth operating unit 507 and a predetermined operation of the predetermined control target that is operated when operating the fifth operating unit 507. When activated by a power that is supplied from the battery B, the first controller 102 is configured to transmit a request signal for requesting connected apparatus information from the bicycle electronic apparatus E to the electric wire L. When the bicycle electronic apparatus E receives the request signal, the bicycle electronic apparatus E is configured to transmit the connected apparatus information to the first controller 102.

The first controller 102 sets the fifth operating unit 507 based on the acquired connected apparatus information related to the bicycle electronic apparatus E, and operation target information that corresponds to the connected apparatus information stored in the first storage unit 104. The first controller 102 sets at least one of the bicycle electronic apparatus E that is operated when operating the fifth operating unit 507, and the operation of the bicycle electronic apparatus E.

If the relevant bicycle electronic apparatus E is detached from the bicycle 10 and another bicycle electronic apparatus E is attached to the bicycle 10 after the fifth operating unit 507 is set, then the first controller 102 is configured to acquire connected apparatus information from the other bicycle electronic apparatus E. The first controller 102 determines whether or not at least one of the configuration, the type, and the function of the bicycle electronic apparatus E has been changed, based on the acquired connected apparatus information related to the bicycle electronic apparatus E. In the case that at least one of the configuration, the type, and the function of the bicycle electronic apparatus E is determined to have been changed, the first controller 102 changes the setting of the fifth operating unit 507 based on the connected apparatus information related to the bicycle electronic apparatus E, and operation target information that corresponds to the connected apparatus information stored in the first storage unit 104.

In this manner, the first controller 102 is configured to set at least one of the predetermined control target and the predetermined operation, according to at least one of the configuration, the type and the function of the bicycle electronic apparatus E When the configuration, the type or the function of the bicycle electronic apparatus E is changed, the first controller 102 further is configured to set at least one of the control targets corresponding to the fifth operating unit 507 and the operation of the control targets corresponding to the fifth operating unit 507.

Figure 5:
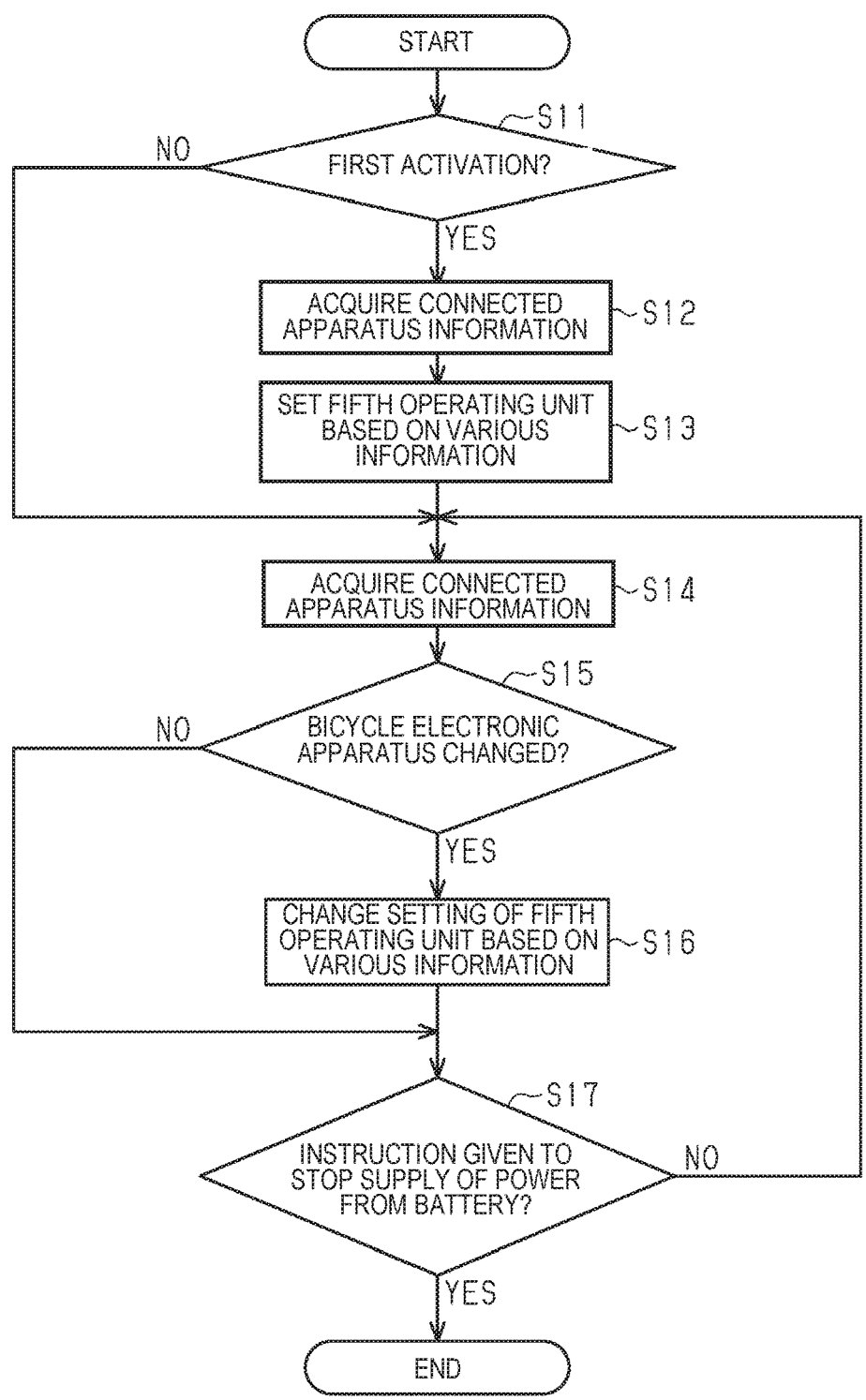
FIG. 5 is a flowchart of a control that is executed by the operation control apparatus of FIG. 3.

FIG. 5 is a setting changing process that is executed by the first controller 102. The first controller 102 starts the setting changing process when activated by power that is supplied from the battery B by an operation of the power switch 604 or the power switch 704. The first controller 102 determines whether or not the current activation is the first activation in Step S11. When the first controller 102 determines that the current activation is the first activation, the process proceeds to Step S12. When the first controller 102 determines that the current activation is the second or a subsequent activation, the process proceeds to Step S14.

The first controller 102 is configured to acquire connected apparatus information by communicating with the bicycle electronic apparatus E in Step S12. The first controller 102 sets the fifth operating unit 507 based on the connected apparatus information acquired by the process of Step S12, and apparatus association information that is stored in the first storage unit 104, in Step S13.

The first controller 102 is configured to acquire connected apparatus information again by communicating with the bicycle electronic apparatus E in Step S14. The first controller 102 determines whether or not a communicable bicycle electronic apparatus E has been changed in Step S15. Specifically, the first controller 102 determines based on the connected apparatus information acquired by the process of Step S12, and the connected apparatus information acquired by the process of Step S14. When the first controller 102 determines that a communicable bicycle electronic apparatus E has been changed, the process proceeds to Step S16. When the first controller 102 determines that a communicable bicycle electronic apparatus E has not been changed, the process proceeds to Step S17. When the current activation is the second or a subsequent activation, the first controller 102 determines whether or not the bicycle electronic apparatus E has been changed, based on the last acquired connected apparatus information during the previous activation, and the connected apparatus information acquired by the process of Step S14.

The first controller 102 changes the setting of the fifth operating unit 507 based on the connected apparatus information acquired by the process of Step S14, and apparatus association information that is stored in the first storage unit 104, in Step S16. The first controller 102 determines whether or not an instruction has been given to stop the supply of power from the battery B by an operation of the power switch 604 or the power switch 704, in Step S17. When it is determined that an instruction has not been given to stop the supply of power from the battery B, the first controller 102 proceeds to Step S14 at a prescribed period. When it is determined that an instruction has been given to stop the supply of power from the battery B, the first controller 102 ends the setting changing process.

One specific example of the setting changing process will be described with reference to FIGS. 6 and 7.

Figure 6:
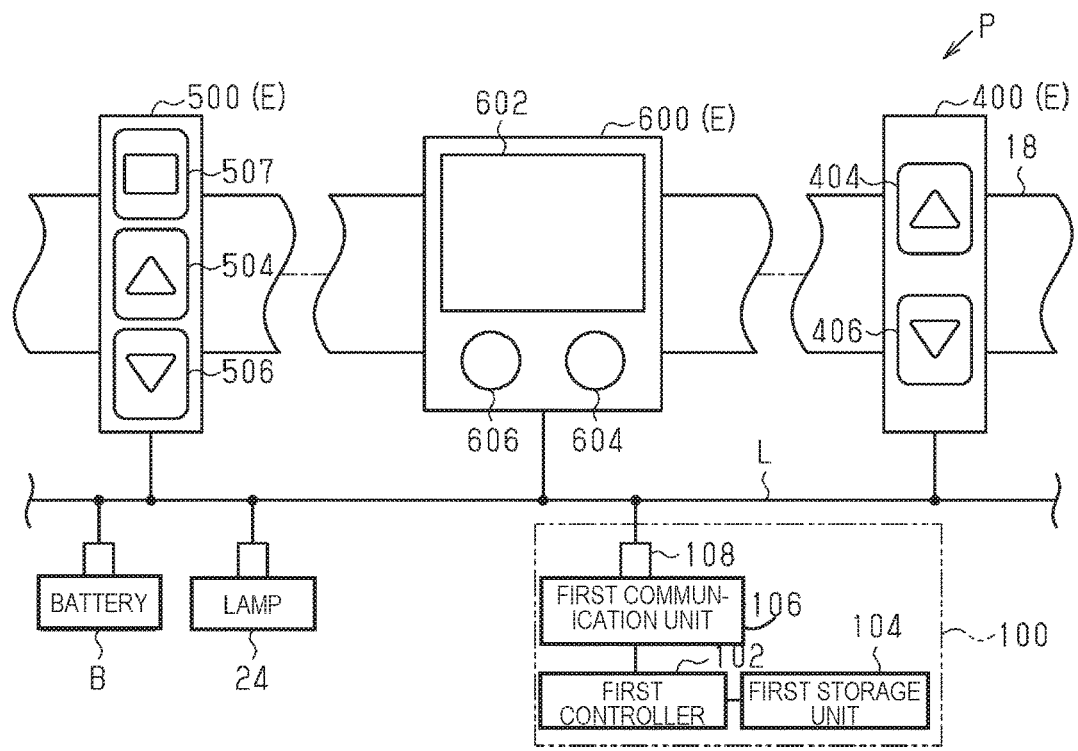
FIG. 6 is a schematic view showing a part of a bicycle to which is mounted the first display unit.

As shown in FIG. 6, when the first display unit 600 is connected to the electric wire L, the first controller 102 is configured to acquire connected apparatus information related to the first display unit 600. The first controller 102 is configured to set the control target of the fifth operating unit 507 and the operation of the bicycle electronic apparatus E corresponding to the operation of the fifth operating unit 507, based on the acquired connected apparatus information and apparatus association information that is stored in the first storage unit 104 shown in Table 1. When the control target of the fifth operating unit 507 is not set to the first display unit 600, the first controller 102 is configured to set the control target of the fifth operating unit 507 to the first display unit 600. When the operation of the bicycle electronic apparatus E corresponding to the operation of the fifth operating unit 507 is not set to an operation to switch the state of the display screen of the first display unit 600, the first controller 102 is configured to set the operation of the bicycle electronic apparatus E corresponding to the operation of the fifth operating unit 507 to the operation to switch the state of the display screen of the first display unit 600. When the fifth operating unit 507 is operated after setting or after changing the control target and the operation, the state of the screen of the first display unit 602 is switched according to the operation. The first display unit 602 is able to switch between, for example, the traveling speed, the travel distance, and the assist possible distance, and display onto the screen.

As shown in FIG. 7, when the second display unit 700 is connected to the electric wire L, the first controller 102 is configured to acquire connected apparatus information related to the second display unit 700. The first controller 102 is configured to set the control target of the fifth operating unit 507 and the operation of the bicycle electronic apparatus E corresponding to the operation of the fifth operating unit 507, based on the acquired connected apparatus information and apparatus association information that is stored in the first storage unit 104 shown in Table 1. When the control target of the fifth operating unit 507 is not set to the lamp 24, the first controller 102 is configured to set the control target to the lamp 24. When the operation of the bicycle electronic apparatus E corresponding to the operation of the fifth operating unit 507 is not set to an operation to switch the lighting state of the lamp 24, the first controller 102 is configured to set the operation of the bicycle electronic apparatus E corresponding to the operation of the fifth operating unit 507 to the operation to switch the lighting state of the lamp 24. When the fifth operating unit 507 is operated after setting or after changing the control target and the operation, the lighting state of the lamp 24 is switched according to the operation.

According to the first embodiment, the following effects are obtained.

(1) The operation control apparatus 100 automatically sets at least one of a predetermined control targets that is operated when operating the fifth operating unit 507, and a predetermined operation of the predetermined control target that is operated when operating the fifth operating unit 507. According to this configuration, it is not necessary for the user to set the fifth operating unit 507, thereby improving usability.

(2) The operation control apparatus 100 automatically changes the setting of the fifth operating unit 507, when the configuration, the type, or the function of the bicycle electronic apparatus E is changed. According to this configuration, it is not necessary for the user to change the setting of the fifth operating unit 507, thereby improving usability.

Second Embodiment

The operation control apparatus 100 according to the second embodiment differs from the operation control apparatus 100 according to the first embodiment in the points described below, and comprises substantially the same configuration as the operation control apparatus 100 according to the first embodiment in the other points. In the description of the operation control apparatus 100 according to the second embodiment, the same reference codes are given to configurations that are shared with the operation control apparatus 100 according to the first embodiment, and some or all of the descriptions of those configurations are omitted.

Table 2 is a table showing one example of the apparatus association information which defines the association relationship between the connected apparatus information and the operation target information which are stored in the first storage unit 104. "No lamp" shown in Table 2 indicates that connected apparatus information related to the lamp 24 has not been acquired by the first controller 102. That is, the lamp 24 is not connected to the electric wire L.

TABLE 2

| OPERATING UNIT | CONNECTED APPARATUS INFORMATION | OPERATION TARGET INFORMATION | |
|---|---|---|---|
| | | CONTROL TARGET | OPERATION |
| FIFTH OPERATING UNIT | FIRST DISPLAY UNIT + LAMP | FIRST DISPLAY UNIT | SWITCH DISPLAY |
| | FIRST DISPLAY UNIT + NO LAMP | FIRST DISPLAY UNIT | SWITCH DISPLAY |
| | SECOND DISPLAY UNIT + LAMP | LAMP | SWITCH LIGHTING STATE |
| | SECOND DISPLAY UNIT + NO LAMP | SECOND DISPLAY UNIT | SWITCH DISPLAY |

When the first display unit 600 and the lamp 24 are connected to the electric wire L, the first controller 102 is configured to acquire connected apparatus information related to the first display unit 600 and the lamp 24. The first controller 102 is configured to set the control target of the fifth operating unit 507 to the first display unit 600. The first controller 102 is further configured to set the operation of the bicycle electronic apparatus E corresponding to the operation of the fifth operating unit 507 to an operation to switch the state of the display screen of the first display unit 600, based on the acquired connected apparatus information and apparatus association information shown in Table 2. When the fifth operating unit 507 is operated after setting or after changing the control target and the operation, the state of the screen of the first display unit 602 is switched according to the operation.

When the first display unit 600 is connected to the electric wire L and the lamp 24 is not connected to the electric wire L, the first controller 102 is configured to acquire connected apparatus information related to the first display unit 600, and does not acquire connected apparatus information related to the lamp 24. The first controller 102 is configured to set the control target of the fifth operating unit 507 to the first display unit 600. The first controller 102 is further configured to set the operation of the bicycle electronic apparatus E corresponding to the operation of the fifth operating unit 507 to an operation to switch the state of the display screen of the first display unit 600, based on the acquired connected apparatus information and apparatus association information shown in Table 2. When the fifth operating unit 507 is operated after setting or after changing the control target and the operation, the state of the screen of the first display unit 602 is switched according to the operation.

When the second display unit 700 and the lamp 24 are connected to the electric wire L, the first controller 102 is configured to acquire connected apparatus information related to the second display unit 700 and the lamp 24. The first controller 102 is configured to set the control target of the fifth operating unit 507 to the lamp 24. The first controller 102 is further configured to set the operation of the bicycle electronic apparatus E corresponding to the operation of the fifth operating unit 507 to an operation to switch the lighting state of the lamp 24, based on the acquired connected apparatus information and apparatus association information shown in Table 2. When the fifth operating unit 507 is operated after setting or after changing the control target and the operation, the lighting state of the lamp 24 is switched according to the operation.

When the second display unit 700 is connected to the electric wire L and the lamp 24 is not connected to the electric wire L, the first controller 102 is configured to acquire connected apparatus information related to the second display unit 700, and does not acquire connected apparatus information related to the lamp 24. The first controller 102 is configured to set the control target of the fifth operating unit 507 to the second display unit 700. The first controller 102 is further configured to set the operation of the bicycle electronic apparatus E corresponding to the operation of the fifth operating unit 507 to an operation to switch the state of the display screen of the second display unit 700, based on the acquired connected apparatus information and apparatus association information shown in Table 2. When the fifth operating unit 507 is operated after setting or after changing the control target and the operation, the state of the screen of the second display unit 702 is switched according to the operation.

According to the second embodiment, the following effects are obtained in addition to the effects of (1) and (2) obtained according to the first embodiment.

(3) The apparatus association information stored in the first storage unit 104 includes information related to a plurality of bicycle electronic apparatuses E as connected apparatus information. Accordingly, it is possible to set the fifth operating unit 507 or change the setting of the fifth operating unit 507, according to the combination of the bicycle electronic apparatuses E that are connected to the operation control apparatus 100.

Third Embodiment

The operation control apparatus 100 according to the third embodiment differs from the operation control apparatus 100 according to the second embodiment in the points described below, and comprises substantially the same configuration as the operation control apparatus 100 according to the second embodiment in the other points. In the description of the operation control apparatus 100 according to the third embodiment, the same reference codes are given to configurations that are shared with the operation control apparatus 100 according to the second embodiment, and some or all of the descriptions of those configurations are omitted.

The information that is stored in the first storage unit 104 of the operation control apparatus 100 includes apparatus association information that associates one piece of connected apparatus information and a plurality of pieces of operation target information, and operation target order information related to the priority in association with the plurality of pieces of operation target information. The operation target order information is determined in advance giving consideration to, for example, the usability of the rider that rides the bicycle 10. The operation target order information can be configured to be set by the user by an external device, or by using an operating unit P that is connected to the operation control apparatus 100.

The first controller 102 of the operation control apparatus 100 is configured to acquire connected apparatus information by communicating with the bicycle electronic apparatus E. The first controller 102 is further configured to set at least one of the predetermined control target that is operated when operating the fifth operating unit 507, and the predetermined operation of the predetermined control target that is operated when operating the fifth operating unit 507, based on the acquired connected apparatus information, and the apparatus association information and the operation target order information that are stored in the first storage unit 104. Table 3 is a table showing one example of the apparatus association information and the operation target order information that are stored in the first storage unit 104.

TABLE 3

| OPERATING UNIT | CONNECTED APPARATUS INFORMATION | OPERATION TARGET INFORMATION | | PRIORITY |
|---|---|---|---|---|
| | | CONTROL TARGET | OPERATION | |
| FIFTH OPERATING UNIT | SECOND DISPLAY UNIT + LAMP | LAMP | SWITCH LIGHTING STATE | 1 |
| | | SECOND DISPLAY UNIT | SWITCH DISPLAY | 2 |

When the second display unit 700 and the lamp 24 are connected to the electric wire L, the first controller 102 is configured to acquire connected apparatus information related to the second display unit 700 and the lamp 24. The first controller 102 is configured to set the control target of the fifth operating unit 507 and the operation of the bicycle electronic apparatus E corresponding to the operation of the fifth operating unit 507, based on the acquired connected apparatus information and the apparatus association information the operation target order information shown in Table 3.

When information related to the operating unit P, which is set to an operating switch the lighting state of the lamp 24, is not included in the connected apparatus information acquired by the first controller 102, the first controller 102 is configured to set the control target of the fifth operating unit 507 to the lamp 24, and is configured to set the operation of the bicycle electronic apparatus E corresponding to the operation of the fifth operating unit 507 to an operation to switch the lighting state of the lamp 24. When the fifth operating unit 507 is operated after setting or after changing the control target and the operation, the lighting state of the lamp 24 is switched according to the operation.

When information related to the operating unit P, which is set to an operation to switch the lighting state of the lamp 24, is included in the connected apparatus information acquired by the first controller 102, the first controller 102 is configured to set the control target of the fifth operating unit 507 to the second display unit 700, which has a lower priority than the lamp 24, and is configured to set the operation of the bicycle electronic apparatus E corresponding to the operation of the fifth operating unit 507 to an operation to switch the state of the display screen of the second display unit 700. When the fifth operating unit 507 is operated after setting or after changing the control target and the operation, the state of the screen of the second display unit 702 is switched according to the operation.

According to the third embodiment, the following effects are obtained in addition to the effects of (1) to (3) obtained according to the second embodiment.

(4) Since the operation control apparatus 100 sets the fifth operating unit 507 or changes the setting of the fifth operating unit 507 based on the operation target order information stored in the first storage unit 104, the usability of the rider can be further improved.

Fourth Embodiment

The operation control apparatus 100 according to the fourth embodiment differs from the operation control apparatus 100 according to the second embodiment in the points described below, and comprises substantially the same configuration as the operation control apparatus 100 according to the second embodiment in the other points. In the description of the operation control apparatus 100 according to the fourth embodiment, the same reference codes are given to configurations that are shared with the operation control apparatus 100 according to the second embodiment, and some or all of the descriptions of those configurations are omitted.

Figure 8:
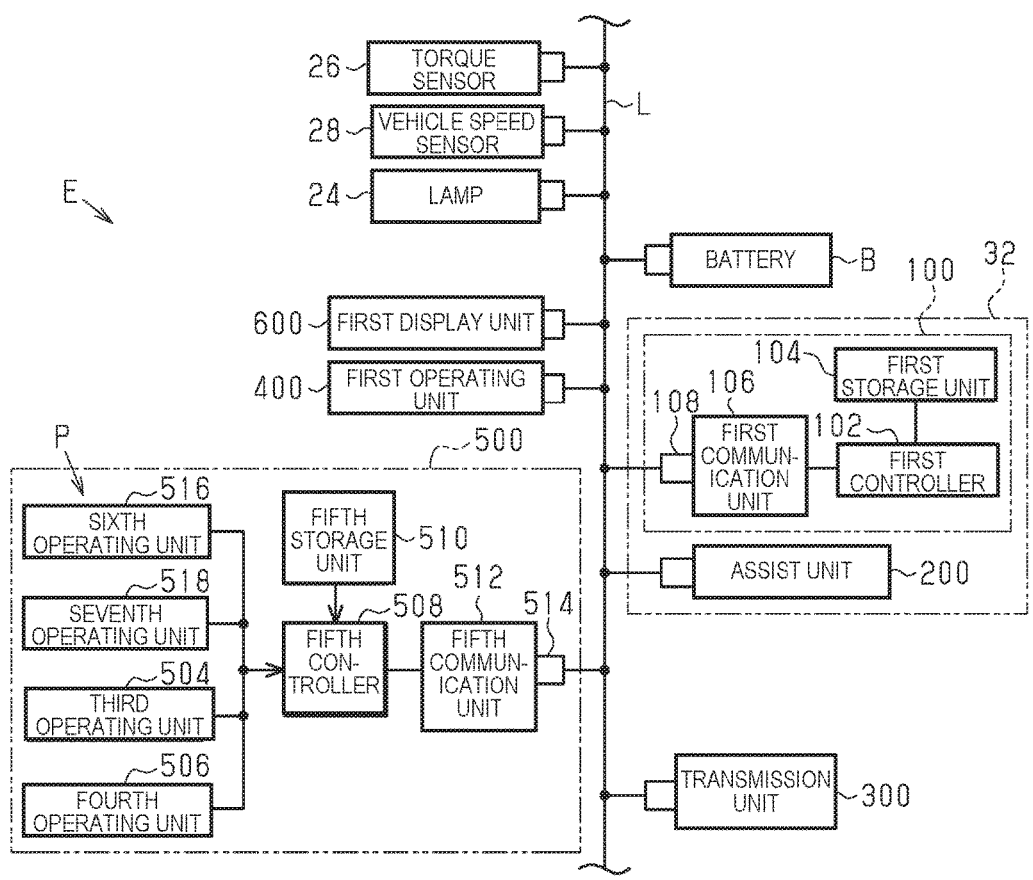
FIG. 8 is a block diagram showing the electrical configuration of a bicycle of the fourth embodiment.

As shown in FIG. 8, the second operating unit 500 further comprises a sixth operating unit 516 and a seventh operating unit 518, which comprise substantially the same configuration as the fifth operating unit 507 (refer to FIG. 3). The operating units 516, 518 are operating units P to cause a predetermined control target to execute a predetermined operation. Apparatus association information that associates the operation target information with connected apparatus information is stored in the first storage unit 104 of the operation control apparatus 100 for each of the sixth and the seventh operating units 516, 518.

The first controller 102 of the operation control apparatus 100 is configured to acquire connected apparatus information by communicating with the bicycle electronic apparatus E, and sets the operating units 516, 518, changes the settings of the operating units 516, 518, and the like, based on the acquired connected apparatus information and the apparatus association information that is stored in the first storage unit 104. Table 4 is a table showing one example of the apparatus association information which defines the association relationship between the connected apparatus information and the operation target information which are stored in the first storage unit 104 for each of the sixth and the seventh operating units 516, 518.

TABLE 4

| OPERATING UNIT | CONNECTED APPARATUS INFORMATION | OPERATION TARGET INFORMATION | |
|---|---|---|---|
| | | CONTROL TARGET | OPERATION |
| SIXTH OPERATING UNIT | FIRST DISPLAY UNIT + LAMP | FIRST DISPLAY UNIT | SWITCH DISPLAY |
| SEVENTH OPERATING UNIT | | TRANSMISSION UNIT | SWITCH SHIFTING MODE |
| SIXTH OPERATING UNIT | FIRST DISPLAY UNIT + NO LAMP | FIRST DISPLAY UNIT | SWITCH DISPLAY |
| SEVENTH OPERATING UNIT | | TRANSMISSION UNIT | SWITCH SHIFTING MODE |
| SIXTH OPERATING UNIT | SECOND DISPLAY UNIT + LAMP | LAMP | SWITCH LIGHTING STATE |
| SEVENTH OPERATING UNIT | | SECOND DISPLAY UNIT | SWITCH DISPLAY |
| SIXTH OPERATING UNIT | SECOND DISPLAY UNIT + NO LAMP | SECOND DISPLAY UNIT | SWITCH DISPLAY |
| SEVENTH OPERATING UNIT | | TRANSMISSION UNIT | SWITCH SHIFTING MODE |

The first controller 102 is configured to set the control target of the operating units 516, 518, as well as the operation of the bicycle electronic apparatus E corresponding to the operation of the operating units 516, 518, based on whether the first display unit 600 or the second display unit 700 is connected to the electric wire L, as well as whether or not the lamp 24 is connected. Regarding the process of the first controller 102, descriptions of the portions, in which the connected apparatus information, the control target, and the operation are the same as the embodiments described above, are omitted.

The first controller 102 is configured to set the control target of the seventh operating unit 518 to the transmission unit 300, and is configured to set the operation of the bicycle electronic apparatus E corresponding to the operation of the seventh operating unit 518 to an operation to switch the shifting mode of the transmission unit 300, when 1) the first display unit 600 is connected to the electric wire L and the lamp 24 is connected to the electric wire L, 2) when the first display unit 600 is connected to the electric wire L and the lamp 24 is not connected to the electric wire L, or 3) when the second display unit 700 is connected to the electric wire L and the lamp 24 is not connected to the electric wire L. The shifting mode includes, for example, manual mode, automatic transmission mode, and synchro mode. The manual mode is a mode in which the gear ratio of the bicycle 10 is changed, for example, according to an operation of the first operating unit 400. The auto mode is a mode in which the gear ratio of the bicycle 10 is automatically changed, for example, based on a detection result, etc., of a vehicle speed sensor 28. The synchro mode is a mode in which, for example when a plurality of transmissions 302 are mounted on the bicycle 10, the plurality of transmissions 302 are operated so that the gear ratio of the bicycle 10 is changed in a stepwise manner, according to an operation, etc., of the first operating unit 400. When the seventh operating unit 518 is operated after setting or after changing the control target and the operation, the shifting mode of the transmission unit 300 is switched according to the operation.

According to the fourth embodiment, the following effects are obtained in addition to the effects of (1) to (3) obtained according to the second embodiment.

(5) The operation control apparatus 100 is able to automatically set a plurality of operating units 516 and 518, and automatically change the settings of the plurality of operating units 516 and 518.

Fifth Embodiment

The operation control apparatus 100 according to the fifth embodiment differs from the operation control apparatus 100 according to the first embodiment in the points described below, and comprises substantially the same configuration as the operation control apparatus 100 according to the first embodiment in the other points. In the description of the operation control apparatus 100 according to the fifth embodiment, the same reference codes are given to configurations that are shared with the operation control apparatus 100 according to the first embodiment, and some or all of the descriptions of those configurations are omitted.

Figure 9:
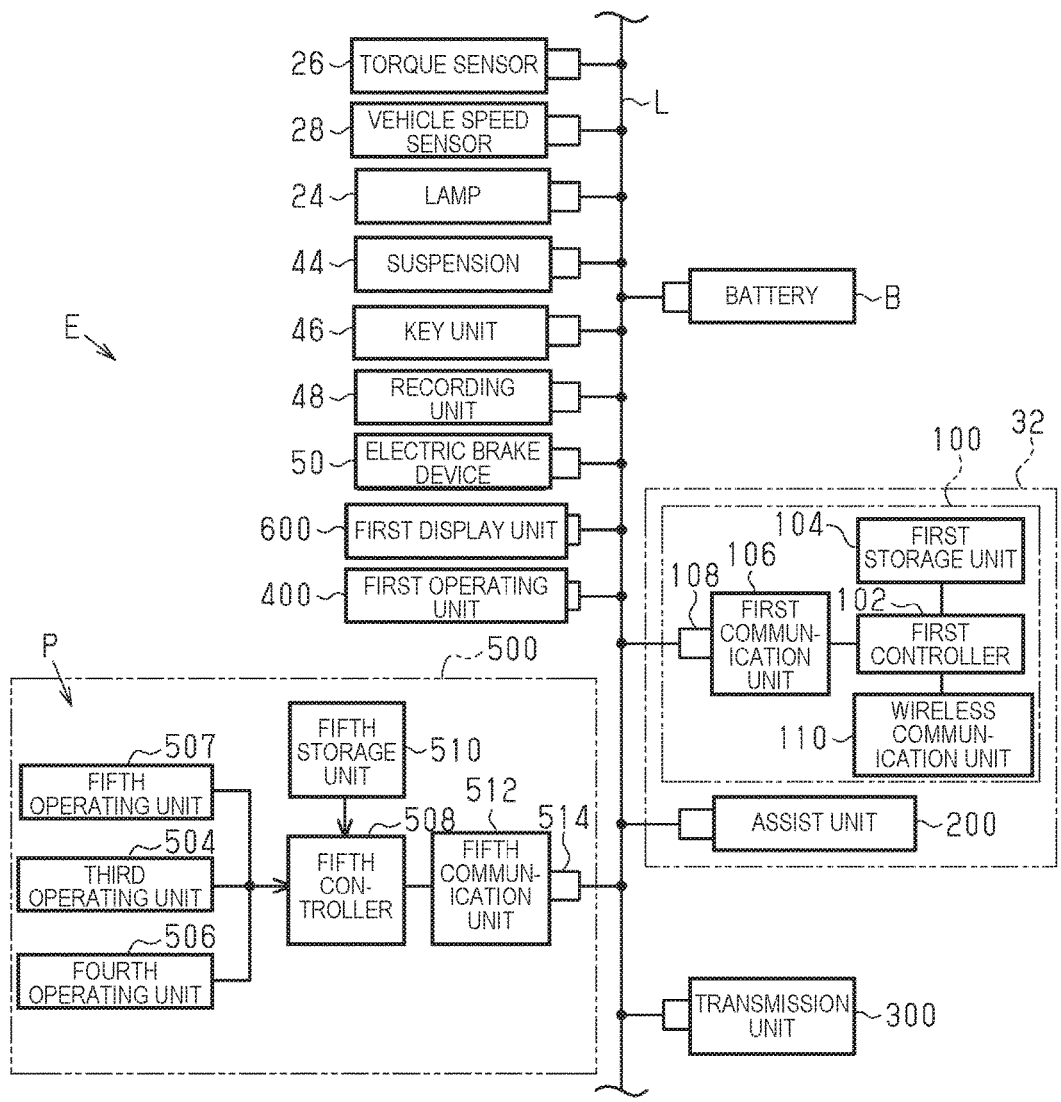
FIG. 9 is a block diagram showing the electrical configuration of a bicycle of the fifth embodiment.

As shown in FIG. 9, the bicycle electronic apparatus E further comprises a suspension 44, a key unit 46, a recording unit 48, and an electric brake device 50. The suspension 44 is, for example, provided to a front fork of the frame 12 (refer to FIG. 1), and buffers the force that the front wheel 14 (refer to FIG. 1) receives from the ground or the like by expanding and contracting. The suspension 44 can be a rear suspension that is provided to the frame 12. The key unit 46 is, for example, attached so as to straddle the frame 12 and the rear wheel 16 (refer to FIG. 1), and prevents a rotation of the rear wheel 16 by locking a key. The recording unit 48 is, for example, attached to an intermediate portion of the handlebar 18 (refer to FIG. 1). The recording unit 48 is a device that is configured to record, for example, images, audio, lap times, and the like.

The electric brake device 50 comprises a braking device that is provided to the frame 12 for braking the front wheel 14 and the rear wheel 16, and an actuator for driving the braking device (both not shown). The brake device can be any of a disc brake device, a rim brake device, a roller brake device, or a band brake device. The electric brake device 50 is able to apply the brake according to an operation of the operating unit P. The electric brake device 50 can also be configured to brake either the front wheel 14 or the rear wheel 16.

The transmission unit 300 of the present embodiment comprises a derailleur (not shown). The derailleur includes at least one front derailleur and a rear derailleur.

The operation control apparatus 100 further comprises a wireless communication unit 110 that is configured to wirelessly communicate with the bicycle electronic apparatus E. The wireless communication unit 110 connects with the bicycle electronic apparatus E so as to be able to wirelessly communicate by, for example, pairing. The first controller 102 of the operation control apparatus 100 is configured to acquire connected apparatus information by, for example, wireless communication of the wireless communication unit 110 with the bicycle electronic apparatus E.

The information that is stored in the first storage unit 104 of the operation control apparatus 100 includes apparatus association information that associates operation target information with each of a plurality of pieces of connected apparatus information, and connected apparatus order information related to the priority in association with the plurality of pieces of connected apparatus information. The connected apparatus order information is determined in advance giving consideration to, for example, the usability of the rider that rides the bicycle 10 (refer to FIG. 1).

Information that is stored in the first storage unit 104 further comprises arrangement information related to the arrangement of the fifth operating unit 507 onto the bicycle 10. The arrangement information is expressed as, for example, "near," "medium," and "far." "Near" indicates that the fifth operating unit 507 is, for example, provided in a position that can be operated by a rider while gripping the handlebar 18. That is, the arrangement information of the fifth operating unit 507 that is provided to the second operating unit 500 is "near." "Medium" indicates that the fifth operating unit 507 is, for example, provided in a position that can be operated by a rider by releasing a hand from the handlebar 18. If the fifth operating unit 507 is, for example, provided to the first display unit 600, etc., that is attached to an intermediate portion of the handlebar 18, then the arrangement information thereof, is "medium." "Far" indicates that the fifth operating unit 507 is provided, for example, in a position that cannot be operated, or that is difficult to be operated, by a rider even when releasing a hand from the handlebar 18. If the fifth operating unit 507 is provided to a seat tube or a carrier, then the arrangement information is "far."

The information that is stored in the first storage unit 104 further comprises recommendation information, which indicates whether or not it is recommended to associate operation target information with the fifth operating unit 507, in association with the arrangement information. When recommended by the recommendation information, the fifth operating unit 507 is associated with the operation target information thereof. When not recommended by the recommendation information, the fifth operating unit 507 is not associated with the operation target information thereof.

The first controller 102 is configured to acquire connected apparatus information by communicating with the bicycle electronic apparatus E, and is configured to set at least one of the predetermined control target that is operated when operating the fifth operating unit 507, and the predetermined operation of the predetermined control target that is operated when operating the fifth operating unit 507, based on the acquired connected apparatus information, as well as the apparatus association information, the connected apparatus order information, the arrangement information, and the recommendation information, which are stored in the first storage unit 104. Table 5 is a table showing one example of the apparatus association information, the connected apparatus order information, the arrangement information, and the recommendation information, which are stored in the first storage unit 104.

TABLE 5

| OPERATING UNIT | ARRANGEMENT INFORMATION | CONNECTED APPARATUS INFORMATION | OPERATION TARGET INFORMATION | | | RECOMMENDATION INFORMATION | | |
|---|---|---|---|---|---|---|---|---|
| | | | CONTROL TARGET | OPERATION | PRIORITY | NEAR | MEDIUM | FAR |
| FIFTH OPERATING UNIT | NEAR | ELECTRIC BRAKE DEVICE | ELECTRIC BRAKE DEVICE | SWITCH ON/OFF | 1 | RECOMMENDED | NOT RECOMMENDED | NOT RECOMMENDED |
| | | BATTERY | BATTERY | SWITCH ON/OFF | 2 | RECOMMENDED | RECOMMENDED | RECOMMENDED |
| | | KEY UNIT | KEY UNIT | LOCK KEY | 3 | RECOMMENDED | RECOMMENDED | RECOMMENDED |
| | | LAMP | LAMP | SWITCH LIGHTING STATE | 4 | RECOMMENDED | RECOMMENDED | RECOMMENDED |
| | | TRANSMISSION UNIT | TRANSMISSION UNIT | SWITCH GEAR SHIFT STAGE NUMBER | 5 | RECOMMENDED | NOT RECOMMENDED | NOT RECOMMENDED |
| | | TRANSMISSION UNIT (SHIFTING MODE PRESENT) | TRANSMISSION UNIT | SWITCH SHIFTING MODE | 6 | RECOMMENDED | RECOMMENDED | NOT RECOMMENDED |
| | | ASSIST UNIT | ASSIST UNIT | SWITCH ASSIST MODE | 7 | RECOMMENDED | RECOMMENDED | NOT RECOMMENDED |
| | | SUSPENSION | SUSPENSION | SWITCH SUSPENSION MODE ON/OFF | 8 | RECOMMENDED | RECOMMENDED | NOT RECOMMENDED |
| | | DISPLAY UNIT | DISPLAY UNIT | SWITCH DISPLAY | 9 | RECOMMENDED | RECOMMENDED | NOT RECOMMENDED |
| | | DISPLAY UNIT (BACK LIGHT FUNCTION PRESENT) | DISPLAY UNIT | SWITCH BACK LIGHT ON/OFF | 10 | RECOMMENDED | RECOMMENDED | NOT RECOMMENDED |
| | | TRANSMISSION UNIT (MULTISTAGE TRANSMISSION FUNCTION PRESENT) | TRANSMISSION UNIT | MULTISTAGE TRANSMISSION | 11 | RECOMMENDED | NOT RECOMMENDED | NOT RECOMMENDED |
| | | TRANSMISSION UNIT (ADJUSTMENT MODE) | TRANSMISSION UNIT | SWITCH ADJUSTMENT MODE ON/OFF | 12 | RECOMMENDED | RECOMMENDED | RECOMMENDED |
| | | TRANSMISSION UNIT (SAVER RESET FUNCTION PRESENT) | TRANSMISSION UNIT | SAVER RESET | 13 | RECOMMENDED | RECOMMENDED | RECOMMENDED |
| | | WIRELESS COMMUNICATION UNIT (PAIRING FUNCTION PRESENT) | WIRELESS COMMUNICATION UNIT | SWITCH PAIRING ON/OFF | 14 | RECOMMENDED | RECOMMENDED | RECOMMENDED |
| | | RECORDING UNIT | RECORDING UNIT | DATA/IMAGE/AUDIO | 15 | RECOMMENDED | RECOMMENDED | NOT RECOMMENDED |
| | | RECORDING UNIT | RECORDING UNIT | RECORD LAP TIMES | 16 | RECOMMENDED | RECOMMENDED | NOT RECOMMENDED |
| | | DISPLAY UNIT (TRAVEL STANCE RECORDABLE) | DISPLAY UNIT | CLEAR TRAVEL DISTANCE | 17 | RECOMMENDED | RECOMMENDED | RECOMMENDED |

When the electric brake device 50 is connected to the electric wire L the first controller 102 is configured to acquire connected apparatus information related to the electric brake device 50. The connected apparatus information related to the electric brake device 50 includes information related to the operating unit P, which is set to execute, for example, an operation to switch ON and OFF the electric brake device 50 when operated. The electric brake device 50 operates the actuator according to the movement amount of the brake lever 20, which is an operating unit P, or the amount that a button type operating unit P is pressed, to brake the front wheel 14 and the rear wheel 16 by the electric brake device 50. The first controller 102 is configured to set the control target of the fifth operating unit 507 and the operation of the bicycle electronic apparatus E corresponding to the operation of the fifth operating unit 507, based on the acquired connected apparatus information and the apparatus association information, the connected apparatus order information, the arrangement information, and the recommendation information, shown in FIG. 5.

When information related to the operating unit P, which is set to execute an operation to switch the ON and OFF of the electric brake device 50 when operated, is not included in the connected apparatus information acquired by the first controller 102, the first controller 102 is configured to set the control target of the fifth operating unit 507 to the electric brake device 50, and is configured to set the operation of the bicycle electronic apparatus E corresponding to the operation of the fifth operating unit 507 to an operation to switch the ON and OFF of the electric brake device 50. When the fifth operating unit 507 is operated after setting or after changing the control target and the operation, the front wheel 14 and the rear wheel 16 are braked according to the operation. On the other hand, when information related to the operating unit P, which is set to execute an operation to switch the ON and OFF of the electric brake device 50 when operated, is included in the connected apparatus information acquired by the first controller 102, the first controller 102 executes the following process.

When the battery B is connected to the electric wire L, the first controller 102 is configured to acquire connected apparatus information related to the battery B. The connected apparatus information related to the battery B includes information related to the operating unit P which is set to execute, for example, an operation to switch ON and OFF the supply of power from the battery B when operated. The first controller 102 is configured to set the control target of the fifth operating unit 507 and the operation of the bicycle electronic apparatus E corresponding to the operation of the fifth operating unit 507, based on the acquired connected apparatus information and the apparatus association information, the connected apparatus order information, the arrangement information, and the recommendation information, shown in FIG. 5.

When information related to the operating unit P, which is set to execute an operation to switch the ON and OFF of the supply of power from the battery B when operated, is not included in the connected apparatus information acquired by the first controller 102, the first controller 102 is configured to set the control target of the fifth operating unit 507 to the battery B, which has a lower priority than the electric brake device 50, and is configured to set the operation of the bicycle electronic apparatus E corresponding to the operation of the fifth operating unit 507 to an operation to switch the ON and OFF of the supply of power from the battery B. When the fifth operating unit 507 is operated after setting or after changing the control target and the operation, the ON and OFF of the supply of power from the battery B is switched according to the operation. On the other hand, when information related to the operating unit P which is set to execute an operation to switch the ON and OFF of the supply of power from the battery B when operated, is included in the connected apparatus information acquired by the first controller 102, the first controller 102 executes the following process.

The first controller 102 advances the process according to priorities as described above. The predetermined control target, which the first controller 102 sets or is configured to change the setting of, as well as the predetermined operation of the predetermined control target, will be described below.

The first controller 102 is able to set or change the control target of the fifth operating unit 507 to the key unit 46, and is able to set or change the operation of the bicycle electronic apparatus E corresponding to the operation of the fifth operating unit 507 to an operation to lock the key of the key unit 46. When the fifth operating unit 507 is operated after setting or after changing the control target and the operation, the key of the key unit 46 is locked according to the operation.

The first controller 102 is able to set or change the control target of the fifth operating unit 507 to the lamp 24, and is able to set or change the operation of the bicycle electronic apparatus E corresponding to the operation of the fifth operating unit 507 to an operation to switch the lighting state of the lamp 24. When the fifth operating unit 507 is operated after setting or after changing the control target and the operation, the lighting state of the lamp 24 is switched according to the operation.

The first controller 102 is able to set or change the control target of the fifth operating unit 507 to the transmission unit 300, and is able to set or change the operation of the bicycle electronic apparatus E corresponding to the operation of the fifth operating unit 507 to an operation to switch the gear shift stage number of the transmission unit 300. When the fifth operating unit 507 is operated after setting or after changing the control target and the operation, the gear ratio of the bicycle 10 is changed according to the operation.

The first controller 102 is able to set or change the control target of the fifth operating unit 507 to the transmission unit 300, and is able to set or change the operation of the bicycle electronic apparatus E corresponding to the operation of the fifth operating unit 507 to an operation to switch the shifting mode of the transmission unit 300. When the fifth operating unit 507 is operated after setting or after changing the control target and the operation, the shifting mode of the transmission unit 300 is switched according to the operation.

The first controller 102 is able to set or change the control target of the fifth operating unit 507 to the assist unit 200, and is able to set or change the operation of the bicycle electronic apparatus E corresponding to the operation of the fifth operating unit 507 to an operation to switch the assist mode of the assist unit 200. When the fifth operating unit 507 is operated after setting or after changing the control target and the operation, the assist mode of the assist unit 200 is switched according to the operation.

The first controller 102 is able to set or change the control target of the fifth operating unit 507 to the suspension 44, and is able to set or change the operation of the bicycle electronic apparatus E corresponding to the operation of the fifth operating unit 507 to an operation to switch the ON and OFF of the suspension mode. When the fifth operating unit 507 is operated after setting or after changing the control target and the operation, the ON and OFF of the suspension mode is switched according to the operation. For example, when the suspension mode is set to ON, the suspension 44 becomes capable of expanding and contracting, and when the suspension mode is set to OFF, the suspension 44 becomes incapable of expanding and contracting.

The first controller 102 is able to set or change the control target of the fifth operating unit 507 to the first display unit 600, and the first controller 102 is able to set or change the operation of the bicycle electronic apparatus E corresponding to the operation of the fifth operating unit 507 to an operation to switch the state of the display screen of the first display unit 600. When the fifth operating unit 507 is operated after setting or after changing the control target and the operation, the state of the screen of the first display unit 602 is switched according to the operation.

The first controller 102 is able to set or change the control target of the fifth operating unit 507 to the first display unit 600, and is able to set or change the operation of the bicycle electronic apparatus E corresponding to the operation of the fifth operating unit 507 to an operation to switch the ON and OFF of the back light. When the fifth operating unit 507 is operated after setting or after changing the control target and the operation, the ON and OFF of the back light is switched according to the operation. By the back light being set ON, the back light of the display screen of the first display unit 602 is turned on, The first controller 102 is able to set or change the control target of the fifth operating unit 507 to the transmission unit 300, and is able to set or change the operation of the bicycle electronic apparatus E corresponding to the operation of the fifth operating unit 507 to an operation in which the transmission unit 300 performs multistage transmission. Multistage transmission is an operation in which the gear shift stage number of the transmission unit 300 shifts up or shifts down by two stages or more. When the fifth operating unit 507 is operated after setting or after changing the control target and the operation, the gear ratio of the bicycle 10 is changed according to the operation.

The first controller 102 is able to set or change the control target of the fifth operating unit 507 to the transmission unit 300, and is able to set or change the operation of the bicycle electronic apparatus E corresponding to the operation of the fifth operating unit 507 to an operation to switch the ON and OFF of an adjustment mode. When the fifth operating unit 507 is operated after setting or after changing the control target and the operation, the ON and OFF of the adjustment mode is switched according to the operation. By the adjustment mode being set to ON, it is possible to adjust the positional relationship between the front sprocket 38 and a chain guide of the front derailleur and/or the positional relationship between the rear sprocket 40 and a chain guide of the rear derailleur, using at least on of, for example, the third operation unit 504 and the fourth operating unit 506, The first controller 102 is able to set or change the control target of the fifth operating unit 507 to the transmission unit 300, and is able to set or change the operation of the bicycle electronic apparatus E corresponding to the operation of the fifth operating unit 507 to an operation to execute a saver reset of the transmission unit 300. When the fifth operating unit 507 is operated after setting or after changing the control target and the operation, a saver reset is executed according to the operation. By the saver reset being executed, the connection between the transmission 302 and the actuator 304 that is temporarily released due to the transmission 302 receiving a strong impact is restored.

The first controller 102 is able to set or change the control target of the fifth operating unit 507 to the wireless communication unit 110, and is able to set or change the operation of the bicycle electronic apparatus E corresponding to the operation of the fifth operating unit 507 to an operation to switch the ON and OFF of the pairing. When the fifth operating unit 507 is operated after setting or after changing the control target and the operation, the ON and OFF of the pairing is switched according to the operation.

The first controller 102 is able to set or change the control target of the fifth operating unit 507 to the recording unit 48, and is able to set or change the operation of the bicycle electronic apparatus E corresponding to the operation of the fifth operating unit 507 to an operation to record data, images, audio or the like with the recording unit 48. When the fifth operating unit 507 is operated after setting or after changing the control target and the operation, the recording of data, images, audio or the like by the recording unit 48 is started or stopped, according to the operation.

The first controller 102 is able to set or change the control target of the fifth operating unit 507 to the recording unit 48, and is able to set or change the operation of the bicycle electronic apparatus E corresponding to the operation of the fifth operating unit 507 to an operation to record lap times with the recording unit 48. When the fifth operating unit 507 is operated after setting or after changing the control target and the operation, the recording of lap times by the recording unit 48 is started or stopped, according to the operation.

The first controller 102 is able to set or change the control target of the fifth operating unit 507 to the first display unit 600, and is able to set or change the operation of the bicycle electronic apparatus E corresponding to the operation of the fifth operating unit 507 to an operation to clear the travel distance that is recorded in the first display unit 600. When the fifth operating unit 507 is operated after setting or after changing the control target and the operation, the travel distance that is recorded in the first display unit 600 is deleted.

As described above, the first controller 102 is configured to set at least one of the predetermined control target that is operated when operating the fifth operating unit 507, and the predetermined operations of the predetermined control target that is operated when operating the fifth operating unit 507. When the arrangement information of the fifth operating unit 507 is "medium" or "far," the operation target information that is not recommended to be associated with the fifth operating unit 507 is not associated with the fifth operating unit 507, even when the priority is high.

According to the fifth embodiment, the following effects are obtained in addition to the effects of (1) and (2) obtained according to the first embodiment.

(6) Since the operation control apparatus 100 sets the fifth operating unit 507 or changes the setting of the fifth operating unit 507 based on the connected apparatus order information stored in the first storage unit 104, the usability of the rider can be further improved.

(7) Since the operation control apparatus 100 sets, or changes the setting of, the fifth operating unit 507 based on the arrangement information and the recommendation information stored in the first storage unit 104, the device contributes to improving the usability of the rider.

Sixth Embodiment

Figure 10:
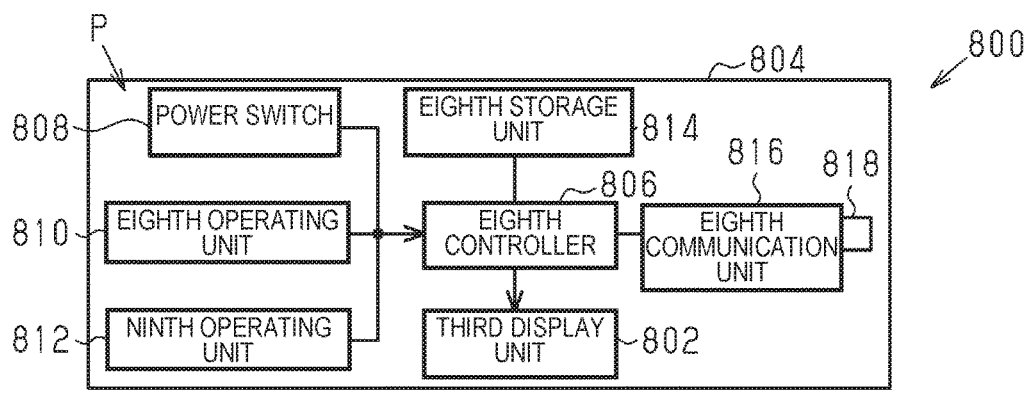
FIG. 10 is a block diagram of a bicycle display device according to a sixth embodiment.

As shown in FIG. 10, bicycle display device 800 comprises a third display unit 802, an operating unit P, and a housing 804 to which the third display unit 802 and the operating unit P are provided, and that can be attached to a bicycle. The third display unit 802 is, for example, a liquid crystal display. The third display unit 802 is configured to display information related to at least one of a running state of the bicycle and the traveling environment. The bicycle display device 800 further comprises an eighth controller 806, which is capable of communicating with the bicycle electronic apparatus E (refer to FIG. 11) that can be mounted on a bicycle. The eighth controller 806 is configured to output a predetermined control target to execute a predetermined operation of the bicycle electronic apparatus according to an operation of an operating unit P that is inputted to the eighth controller 806. In the description of the bicycle display device 800 of the present embodiment, the same configurations described in the embodiments above may be given the same reference symbols, and the descriptions thereof may be omitted.

The bicycle display device 800 further comprises a power switch 808, an eighth operating unit 810 and a ninth operating unit 812. The power switch 808 is an operating unit P that is operated to switch ON and OFF the power of the bicycle display device 800. The eighth operating unit 810 is an operating unit P to cause a predetermined control target to carry out a predetermined operation The ninth operating unit 812 is an operating unit P to cause a predetermined control target to carry out a predetermined operation. The operating units 810 and 812 comprise substantially the same configuration as the fifth operating unit 507 (refer to FIG. 3) of the first embodiment, The bicycle display device 800 can be attached to a bicycle, in the same way as the first display unit 600, and the like. When the bicycle display device 800 is mounted on a bicycle, that is, when the bicycle display device 800 is electrically connected to the electric wire L (refer to FIG. 11) of a bicycle, power is supplied from the battery B to a bicycle electronic apparatus E, which included the bicycle display device 800, by a power switch 808 being operated. The ON and OFF of the power of the bicycle display device 800 is switched by the power switch 808 being operated. Operation of the operating units 810 and 812 become possible by power being supplied from the battery B by an operation of the power switch 808.

Figure 11:
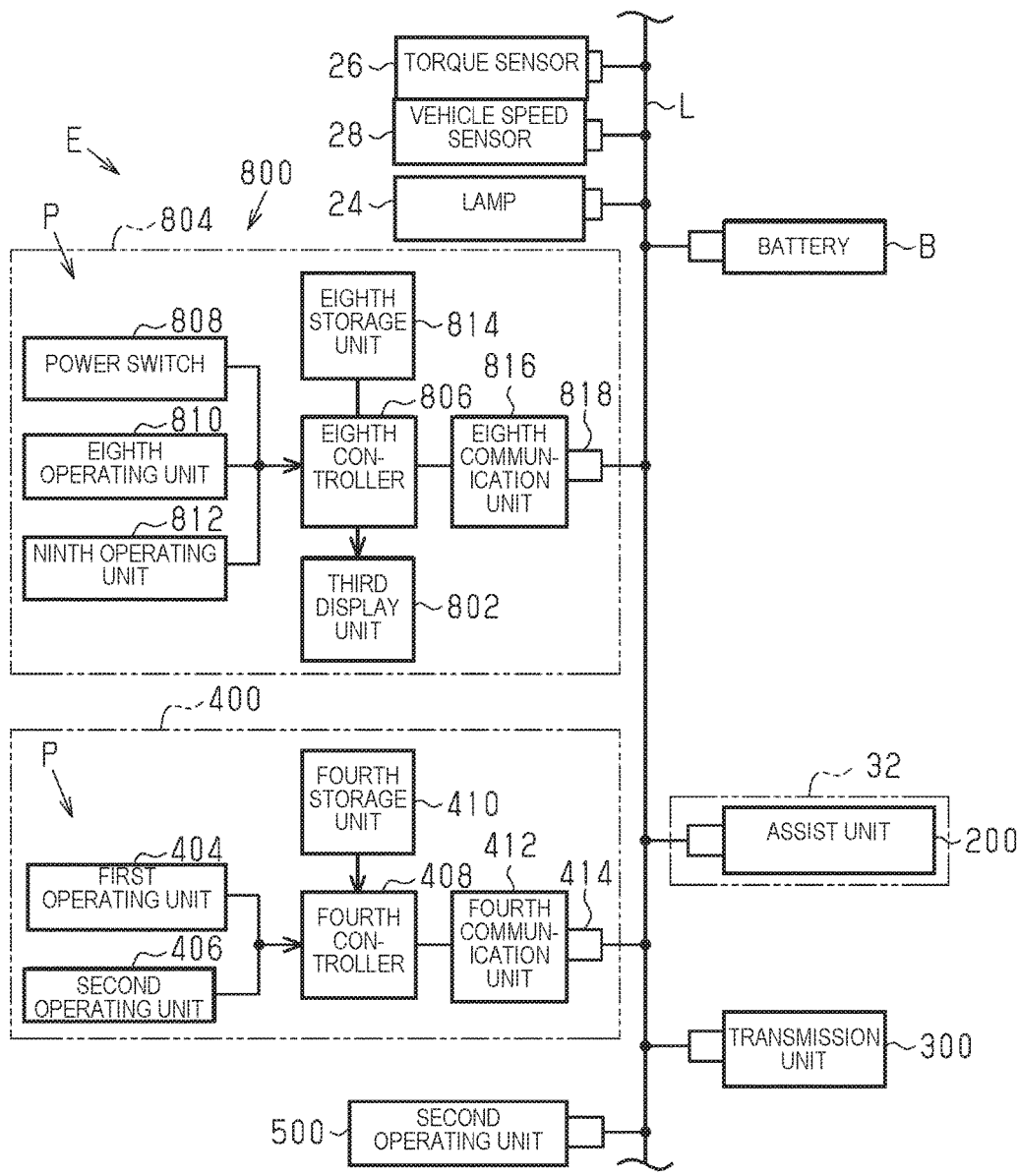
FIG. 11 is a block diagram showing the electrical configuration of a bicycle to which is mounted the bicycle display device.

The bicycle display device 800 is configured to set a predetermined control target, according to an instruction from an eighth controller 806 or an external device. The eighth controller 806 is configured to set at least one of the predetermined control target that is operated when each of the eighth operating unit 810 and the ninth operating unit 812 is operated, and a predetermined operation of the predetermined control target that is operated when the operating units are operated, according to at least one of the configuration, the type, and the function of the bicycle electronic apparatus E. The eighth controller 806 further sets the operating units 810 and 812, or changes the settings of the operating units 810 and 812, when the configuration, the type, or the function of the bicycle electronic apparatus E is changed. The eighth controller 806 includes a calculation processing device for executing a predetermined control program. The calculation processing device includes, for example, a CPU or an MPU that includes a one or more processors. The eighth controller 806 also preferably includes other conventional components such as an input interface circuit, an output interface circuit. The eighth controller 806 is configured to display information that is sent via the electric wire L to the third display unit 802, switches the state of the display screen of the third display unit 802, and the like. 101511 As shown in FIG. 11, the bicycle display device 800 includes, for example, the lamp 24, the battery B, the torque sensor 26, the vehicle speed sensor 28, the drive unit 32 comprising the assist unit 200, the transmission unit 300, the first operating unit 400, and the second operating unit 500 without the fifth operating unit 507 (refer to FIG. 3). These components are all mounted to a bicycle to which is provided with the bicycle display device 800. In this bicycle, the bicycle electronic apparatuses E are electrically connected by the electric wire L, so as to be able to execute power line communication between the bicycle electronic apparatuses E.

The bicycle display device 800 further comprises an eighth storage unit 814, an eighth communication unit 816 and an eighth connection part 818. The eighth storage unit 814 is configured to store a predetermined control program that is executed by the calculation processing device of the eighth controller 806. The eighth storage unit 814 is preferably any memory device (i.e., a non-transitory computer readable medium such as a ROM (Read Only Memory) device, hard disk, etc.). The information stored in the eighth storage unit 814 includes operation target information, which corresponds to at least one of the predetermined control target and the predetermined operation, and apparatus association information that associates the operation target information with connected apparatus information, which corresponds to at least one of the configuration, the type, and the function of the bicycle electronic apparatus E. The apparatus association information is stored for each of the eighth and the ninth operating units 810 and 812.

The eighth communication unit 816 is configured to transmit power and information from the electric wire L to the eighth controller 806, and is configured to transmit information from the eighth controller 806 to the electric wire L. The eighth connection part 818 is provided to the eighth communication unit 816, and is connected to the bicycle electronic apparatus E via the electric wire L. The eighth connection part 818 is equipped with a connection terminal, and the electric wire L comprises a connector that is detachable and reattachable with the connection terminal of the eighth connection part 818. The eighth connection part 818 is, for example, detachable and reattachable with respect to the electric wire L without causing damage. By the electric wire L being connected with the eighth connection part 818, the electric wire L and the eighth controller 806 are electrically connected via the eighth communication unit 816. The eighth connection part 818 and the electric wire L can be connected via a bracket. In this case, a first terminal that can be connected to the connection terminal of the eighth connection part 818 and a second terminal that can be connected to the electric wire L are provided to the bracket.

The eighth controller 806 is configured to acquire connected apparatus information by communicating with the bicycle electronic apparatus E. The eighth controller 806 is further configured to set at least one of the predetermined control target that is operated when operating the operating units 810 and 812, and the predetermined operation of the predetermined control target that is operated when operating the operating units 810 and 812, based on the acquired connected apparatus information and the apparatus association information that is stored in the eighth storage unit 814. Table 6 is a table showing one example of the apparatus association information which defines the association relationship between the connected apparatus information and the operation target information which are stored in the eighth storage unit 814 for each of the eighth and the ninth operating units 810 and 812.

TABLE 6

| OPERATING UNIT | CONNECTED APPARATUS INFORMATION | OPERATION TARGET INFORMATION | |
|---|---|---|---|
| | | CONTROL TARGET | OPERATION |
| EIGHTH OPERATING UNIT | DRIVE UNIT + LAMP | BATTERY | POWER ON/OFF |
| NINTH OPERATING UNIT | | LAMP | SWITCH LIGHTING STATE |
| EIGHTH OPERATING UNIT | DRIVE UNIT + NO LAMP | BATTERY | POWER ON/OFF |
| NINTH OPERATING UNIT | | TRANSMISSION UNIT | SWITCH SHIFTING MODE |

When the drive unit 32 and the lamp 24 are connected to the electric wire L, the eighth controller 806 is configured to acquire connected apparatus information related to the drive unit 32 and the lamp 24. The eighth controller 806 is configured to set the control target of the operating units 810 and 812, and the operation of the bicycle electronic apparatus E corresponding to the operation of the operating units 810 and 812, based on the acquired connected apparatus information and the apparatus association information shown in Table 6. When connected apparatus information related to the drive unit 32 and the lamp 24 is acquired, the eighth controller 806 is configured to set the control target of the eighth operating unit 810 to the battery B, and is configured to set the operation of the bicycle electronic apparatus E corresponding to the operation of the eighth operating unit 810 to an operation to switch the ON and OFF of the supply of power from the battery B. When the eighth operating unit 810 is operated after setting or after changing the control target and the operation, the ON and OFF of the supply of power from the battery B is switched according to the operation.

Further, when connected apparatus information related to the drive unit 32 and the lamp 24 is acquired, the eighth controller 806 is configured to set the control target of the ninth operating unit 812 to the lamp 24, and is configured to set the operation of the bicycle electronic apparatus E corresponding to the operation of the ninth operating unit 812 to an operation to switch the lighting state of the lamp 24. When the ninth operating unit 812 is operated after setting or after changing the control target and the operation, the lighting state of the lamp 24 is switched according to the operation.

When the drive unit 32 is connected to the electric wire L and the lamp 24 is not connected to the electric wire L connected apparatus information related to the drive unit 32 is acquired, and connected apparatus information related to the lamp 24 is not acquired. The eighth controller 806 is configured to set the control target of the operating units 810 and 812, and the operation of the bicycle electronic apparatus E corresponding to the operation of the operating units 810 and 812, based on the acquired connected apparatus information and the apparatus association information shown in Table 6. When connected apparatus information related to the drive unit 32 is acquired, and connected apparatus information related to the lamp 24 is not acquired, the eighth controller 806 sets or changes the control target of the eighth operating unit 810 to the battery B, and is configured to set the operation of the bicycle electronic apparatus E corresponding to the operation of the eighth operating unit 810 to an operation to switch the ON and OFF of the supply of power from the battery B. When the eighth operating unit 810 is operated after setting or after changing the control target and the operation, the ON and OFF of the supply of power from the battery B is switched according to the operation.

Further, when connected apparatus information related to the drive unit 32 is acquired, and connected apparatus information related to the lamp 24 is not acquired, the eighth controller 806 is configured to set the control target of the ninth operating unit 812 to the transmission unit 300, and is configured to set the operation of the bicycle electronic apparatus E corresponding to the operation of the ninth operating unit 812 to an operation to switch the shifting mode of the transmission unit 300. When the ninth operating unit 812 is operated after setting or after changing the control target and the operation, the shifting mode of the transmission unit 300 is switched according to the operation.

According to the sixth embodiment, the following effects are obtained.

(8) The bicycle display device 800 automatically sets at least one of the predetermined control target that is operated when operating the operating units 810 and 812, and the predetermined operation of the predetermined control target that is operated when operating the operating units 810 and 812. According to this configuration, it is not necessary for the user to set the operating units 810 and 812, thereby improving usability, (9) The bicycle display device 800 automatically changes the setting of the operating units 810 and 812, when the configuration, the type, or the function of the bicycle electronic apparatus E is changed. According to this configuration, it is not necessary for the user to change the setting of the operating units 810 and 812, thereby improving usability, Modified Examples The descriptions relating to each embodiment described above are examples of forms that the operation control apparatus and the bicycle display device according to the present invention can take, and are not intended to limit the forms thereof. The operation control apparatus and the bicycle display device according to the present invention may, in addition to each of the embodiments, take forms of each modified example of the embodiments shown below, as well as forms that combine at least two modified examples that are not mutually contradictory.

Figure 12:
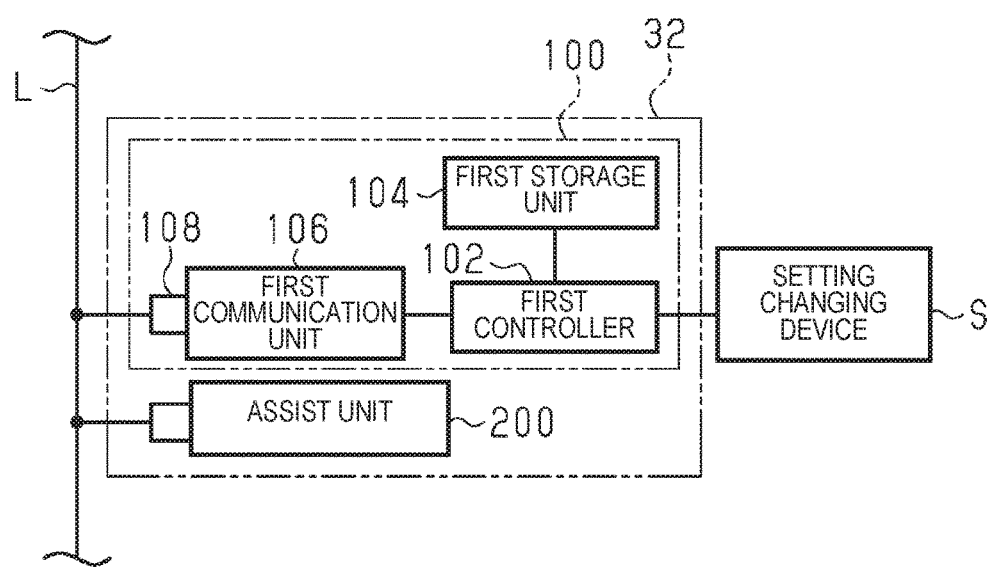
FIG. 12 is a block diagram showing the configuration of the bicycle control apparatus of a modified example.

As shown in FIG. 12, the operation control apparatus 100 of the modified example is configured to communicate with a setting changing device S which is configured to change the association between the connected apparatus information and the operation target information, which are stored in the first storage unit 104. The setting changing device S is, for example, a personal computer. When the setting changing device S and the first controller 102 of the operation control apparatus 100 are communicably connected, and the association between the connected apparatus information and the operation target information is changed by the setting changing device S being operated, the information that is stored in the first storage unit 104 is updated by the first controller 102. Accordingly, it is possible to freely set or change at least one of the predetermined control target that are operated when operating the fifth operating unit 507, and the predetermined operation of the predetermined control target that is operated when operating the fifth operating unit 507.

Whether or not the first connection part 108 of the operation control apparatus 100 is detachable and reattachable with respect to the electric wire L can be arbitrarily changed. According to one example, the first connection part 108 and the electric wire L are connected so as to be not detachable.

Whether or not the operation control apparatus 100 is included in the drive unit 32 can be arbitrarily changed. The operation control apparatus 100 of a modified example is included in any one of, for example, the transmission unit 300, the first operating unit 400, the second operating unit 500, and the first display unit 600.

In the initial state, the first controller 102 of a modified example has set a predetermined control target that is operated when operating the fifth operating unit 507 and a predetermined operation of the predetermined control target that is operated when operating the fifth operating unit 507. According to one example, when the fifth operating unit 507 is operated in the initial state, the first controller 102 switches the lighting state of the lamp 24. According to this modified example, the processes of Step S11 to Step S13 can be omitted from the process that is shown in FIG. 5.

The first controller 102 of the operation control apparatus 100 of a modified example can be configured to set or change at least one of a predetermined control targets that is operated when operating the operating unit P, and the predetermined operations of the predetermined control target that is operated when operating the operating unit P with respect to at least one of the operating units P other than the fifth operating unit 507. According to one example, the first controller 102 causes a lamp switch 606 of the first display unit 600 as a switch to execute a predetermined operation of another bicycle electronic apparatus E.

The number of the operating units P comprising substantially the same configuration as the fifth operating unit 507 can be arbitrarily changed. According to a modified example of the first embodiment, in addition to the fifth operating unit 507, at least one or more operating units P comprising substantially the same configuration as the fifth operating unit 507 are mounted to the bicycle 10. The same modification can be established in the second embodiment, the third embodiment, and the fifth embodiment.

The information that is stored in the first storage unit 104 of the operation control apparatus 100 includes a first apparatus association information that associates one piece of connected apparatus information and a plurality of pieces of operation target information, operation target order information, a second apparatus association information that associates operation target information with each of a plurality of pieces of connected apparatus information, and connected apparatus order information. The first controller 102 of the operation control apparatus 100 is configured to acquire connected apparatus information by communicating with the bicycle electronic apparatus E, and sets the fifth operating unit 507, changes the settings of the fifth operating unit 507, and the like, based on the acquired connected apparatus information, as well as the first apparatus association information, the operation target order information, the second apparatus association information, and the connected apparatus order information which are stored in the first storage unit 104.

The first storage unit 104 of the operation control apparatus 100 of a modified example is configured to store operation target information that corresponds to only one of a predetermined control target or a predetermined operation.

The first controller 102 of the operation control apparatus 100 of a modified example is configured to set only the operation of the bicycle electronic apparatus E corresponding to the operation of the fifth operating unit 507, without changing the control target. According to one example, the first controller 102 changes the operation the operation of the bicycle electronic apparatus E corresponding to the operation of the fifth operating unit 507 from an operation to switch the state of the display screen of the first display unit 600 to an operation to switch the ON and OFF of the back light of the first display unit 600.

The first controller 102 of the operation control apparatus 100 of a modified example can set two predetermined control targets that are operated when operating the fifth operating unit 507. According to one example, the first controller 102 sets the control target of the fifth operating unit 507 to the lamp 24 and the first display unit 600, and sets the operation of the bicycle electronic apparatus E corresponding to the operation of the fifth operating unit 507 to an operation to switch the lighting state of the lamp 24, and to an operation to switch the state of the display screen of the first display unit 600. After setting or after changing the control target and the operation, when the fifth operating unit 507 is operated by, for example, short pressing, the lighting state of the lamp 24 is switched according to the operation, and when the fifth operating unit 507 is operated by, for example, long pressing, the state of the screen of the first display unit 602 is switched according to the operation. According to this modified example, it is possible to newly set a predetermined control target that is operated when operating the fifth operating unit 507 and a predetermined operation of the predetermined control target that is operated when operating the fifth operating unit 507, in the process of Step S16 shown in FIG. 5.

The first controller 102 of the operation control apparatus 100 of a modified example, is configured to set the predetermined control target that is operated when operating the fifth operating unit 507 and the predetermined operation of the predetermined control target that is operated when operating the fifth operating unit 507, to overlap with a predetermined control target that is operated when operating another operating unit P that is mounted on the bicycle 10, and with a predetermined operation of the predetermined control target that is operated when operating the operating unit P.

The operation control apparatus 100 of a modified example of the fifth embodiment can take a form omitting wireless communication unit 110.

According to the operation control apparatus 100 of a modified example of the fifth embodiment, the arrangement information and the recommendation information are omitted from the information that is stored in the first storage unit 104.

According to the bicycle display device 800 of a modified example of the sixth embodiment, a predetermined control target is set or changed according to an instruction from an external device. The external device is, for example, a personal computer of one controller that configures the bicycle electronic apparatus E.

The bicycle display device 800 of a modified example of the sixth embodiment further comprises at least one or more operating units P comprising substantially the same configuration as the fifth operating unit 507, in addition to the eighth operating unit 810 and the ninth operating unit 812.

The bicycle display device 800 of a modified example of the sixth embodiment can take a form omitting either the eighth operating unit 810 or the ninth operating unit 812, Whether or not the torque sensor 26 is configured by a strain sensor can be arbitrarily changed. According to one example, the torque sensor 26 is configured by a magnetostrictive sensor. In this case, for example, magnetostrictive element is attached to a power transmission path from the crankshaft 22 to the front sprocket 38, the strain of the magnetostrictive element is detected by the magnetostrictive sensor.

Whether or not the vehicle speed sensor 28 is provided to the front fork of the frame 12 can be arbitrarily changed. According to one example, the vehicle speed sensor 28 is provided to a chain stay of the frame 12 or a housing of the drive unit 32. In this case, the vehicle speed sensor 28 responds to a magnet that is provided to the rear wheel 16, and outputs a signal that reflects the rotation speed of the rear wheel 16.

Whether or not the first display unit 600 is provided to an intermediate portion of the handlebar 18 can be arbitrarily changed. According to one example, the first display unit 600 is provided to a stem of the frame 12 that couples the handlebar 18 and the front fork. According to another example, the first display unit 600 is provided to a top tube or a down tube of the frame 12.

Whether or not the first operating unit 404 includes a push-button type switch can be arbitrarily changed. According to one example, the first operating unit 404 includes a lever-type switch. According to another example, the first operating unit 404 includes a sliding switch. According to yet another example, the first operating unit 404 includes a touch panel. That is, any configuration can be employed for the first operating unit 404, as long as the configuration that can be operated by the driver. The same modification can be established in the second operating unit 406, the third operation unit 504, the fourth operating unit 506, the fifth operating unit 507, the sixth operating unit 516, the seventh operating unit 518, the eighth operating unit 810, and the ninth operating unit 812.

Whether or not all of the bicycle electronic apparatuses E execute power line communication by the electric wire L can be arbitrarily changed. According to one example, at least one communication unit of the communication units connected to the electric wire L carries out communication with the bicycle electronic apparatuses E by wireless, instead of power line communication by the electric wire L. Power from the battery B can be supplied via the electric wire L to the bicycle electronic apparatus E comprising a communication unit that carries out communication by wireless, or a chargeable battery can be detachably provided inside the bicycle electronic apparatus E.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed, While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An operation control apparatus comprising:
   a controller configured to be connected to a bicycle electronic apparatus that is configured to be mounted on a bicycle; and
   the controller configured to operate a predetermined control target to execute a predetermined operation of the predetermined control target according to an operation of an operating unit that is inputted to the controller,
   the controller being configured to set at least one of the predetermined control target and the predetermined operation, according to at least one of a configuration, a type, and function of the connected bicycle electronic apparatus.

2. The operation control apparatus as recited in claim 1, wherein
   the controller is configured to set at least one of the predetermined control target and the predetermined operation, when at least one of the configuration, the type, or the functions of the bicycle electronic apparatus are changed.

3. The operation control apparatus as recited in claim 1, further comprising:

a storage unit configured to store operation target information that corresponds to at least one of the predetermined control target and the predetermined operation.

4. The operation control apparatus as recited in claim 3, wherein
the storage unit is configured to store the operation target information in association with connected apparatus information corresponding to at least one of the configuration, the type and the function of the bicycle electronic apparatus.

5. The operation control apparatus as recited in claim 4, wherein
the controller is configured to acquire the connected apparatus information by communicating with the bicycle electronic apparatus, and set at least one of the predetermined control target or the predetermined operation, based on the operation target information that corresponds to the connected apparatus information that is stored in the storage unit.

6. The operation control apparatus as recited in claim 4, wherein
the storage unit is configured to store a plurality of pieces of the operation target information in association with one piece of the connected apparatus information.

7. The operation control apparatus as recited in claim 6, wherein
the storage unit stores operation target order information related to a priority in association with the plurality of pieces of the operation target information; and
the controller is configured to set at least one of the predetermined control target and the predetermined operation based on the operation target order information.

8. The operation control apparatus as recited in claim 4, wherein
the storage unit is configured to store a plurality of pieces of the operation connected apparatus information and the operation target information that respectively corresponds to the plurality of pieces of connected apparatus information.

9. The operation control apparatus as recited in claim 8, wherein
the storage unit is configured to store connected apparatus order information related to the priority in association with the plurality of pieces of the connected apparatus information; and
the controller is configured to set at least one of the predetermined control target and the predetermined operation based on the connected apparatus order information.

10. The operation control apparatus as recited in claim 4, wherein
the controller is configured to communicate with a setting changing device to change the association between the connected apparatus information and the operation target information, which are stored in the storage unit.

11. The operation control apparatus as recited in claim 3, wherein
the storage unit is configured to store arrangement information related to an arrangement of the operating unit on the bicycle; and
the controller is configured to set or change at least one of the predetermined control target and the predetermined operation based on the arrangement information.

12. The operation control apparatus as recited in claim 1, further comprising:
a connection part that is configured to be connected to the bicycle electronic apparatus via an electric wire.

13. The operation control apparatus as recited in claim 12, wherein
the electric wire and the connection part are connected by a detachable and reattachable connection.

14. The operation control apparatus as recited in claim 1, further comprising:
a wireless communication unit that can communicate with the bicycle electronic apparatus.

15. The operation control apparatus as recited in claim 1, wherein
the controller is configured to communicate with a first display unit equipped with a switch for a lamp of the bicycle; and
the controller is configured to communicate with a second display unit that is not equipped with a switch for the bicycle lamp and,
the controller being configured to switching a state of a screen of the first display unit when the operating unit is operated,
the controller being configured to switch a lighting state of the bicycle lamp when the operating unit is operated.

16. A bicycle display device comprising:
a display unit;
an operating unit;
a housing configured to be attached to a bicycle and to support the display unit and the operating unit; and
a controller configured to be connected to a bicycle electronic apparatus that is configured to mount on the bicycle, the controller being configured to operate a predetermined control target according to an operation of the operating unit inputted to the controller,
the bicycle display device being configured to set the predetermined control target according to an instruction from one of the controller and an external device.

* * * * *